US007994098B2

(12) United States Patent
Kim et al.

(10) Patent No.: US 7,994,098 B2
(45) Date of Patent: Aug. 9, 2011

(54) LIGHT DIRECTED DNA SYNTHESIS USING INVERSE CAPPING FOR ERROR REDUCTION

(75) Inventors: Changhan Kim, Madison, WI (US); Franco Cerrina, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 615 days.

(21) Appl. No.: 11/298,949

(22) Filed: Dec. 9, 2005

(65) Prior Publication Data

US 2007/0134677 A1 Jun. 14, 2007

(51) Int. Cl.
*C40B 60/02* (2006.01)
(52) U.S. Cl. .................. 506/34; 435/4; 435/6; 536/23.1
(58) Field of Classification Search .................. None
See application file for complete search history.

(56) References Cited

U.S. PATENT DOCUMENTS

| 5,143,854 | A  | * | 9/1992 | Pirrung et al. ............... 436/518 |
| 6,300,137 | B1 | * | 10/2001 | Earhart et al. ............... 436/94 |
| 6,375,903 | B1 |   | 4/2002 | Cerrina et al. |
| 2001/0049108 | A1 | * | 12/2001 | McGall et al. ............... 435/6 |
| 2003/0068633 | A1 |   | 4/2003 | Belshaw et al. |
| 2003/0143550 | A1 |   | 7/2003 | Green et al. |
| 2003/0143724 | A1 |   | 7/2003 | Cerrina et al. |
| 2003/0148502 | A1 |   | 8/2003 | Green et al. |
| 2004/0126757 | A1 |   | 7/2004 | Cerrina |
| 2005/0249396 | A1 |   | 11/2005 | Cerrina et al. |
| 2009/0062148 | A1 | * | 3/2009 | Goldberg et al. ............... 506/32 |

OTHER PUBLICATIONS

Kim et al (2004 J. Vac. Sci. Technol. B 22:3163-3167).*
Singh-Gasson et al (1999 Nature Biotechnology 17: 974-978).*

* cited by examiner

*Primary Examiner* — Christopher M Gross
(74) *Attorney, Agent, or Firm* — Joseph T. Leone, Esq.; DeWitt Ross & Stevens S.C.

(57) ABSTRACT

A prepared substrate upon which light directed DNA synthesis is to occur is exposed to light via an inverse mask pattern to deprotect inactive regions of the substrate where the synthesis is not intended to occur. The deprotected sites are then capped to disable permanently the inactive areas, thereby forming an inverse capped substrate. Unwanted DNA synthesis in the inactive areas is thus prevented, resulting in purer quality DNA, even though such areas may be exposed to light due to diffraction, scattering and flare during subsequent DNA synthesis of the intended active areas of the substrate.

19 Claims, 20 Drawing Sheets

LIGHT DIRECTED DNA SYNTHESIS USING INVERSE CAPPING FOR ERROR REDUCTION

This invention was made with United States government support awarded by the following agencies: DOD ARPA DAAD19-02-2-0026, NIH HG003275. The United States has certain rights in this invention.

FIELD OF THE INVENTION

This invention pertains generally to the field of biology and particularly to techniques and apparatus for the manufacture of arrays of polymers useful in the fabrication of microarray DNA and related polymers and more particularly to light directed parallel DNA synthesis on a substrate.

BACKGROUND OF THE INVENTION

The sequencing of deoxyribonucleic acid (DNA) is a fundamental tool of modern biology and is conventionally carried out in various ways, commonly by processes which separate DNA segments by electrophoresis. Such sequencing techniques can be used to determine which genes are active and which are inactive, either in specific tissues, such as cancers, or more generally in individuals exhibiting genetically influenced diseases. The results of such investigations can allow identification of the proteins that are good targets for new drugs or identification of appropriate genetic alterations that may be effective in genetic therapy. Other applications lie in fields such as soil ecology or pathology where it would be desirable to be able to isolate DNA from any soil or tissue sample and use probes from ribosomal DNA sequences from all known microbes to identify the microbes present in the sample.

The conventional sequencing of DNA using electrophoresis is typically laborious and time consuming. Various alternatives to conventional DNA sequencing have been proposed. One such alternative approach utilizes an array of oligonucleotide probes synthesized by photolithographic techniques. Cyclic DNA chain growth is performed by consecutive attachment of a base to a preexisting strand on a solid support such as a glass or silicon substrate. The surface of the solid support or substrate, as modified with photolabile protecting groups, is illuminated through a photolithographic mask, yielding reactive hydroxyl groups in the illuminated regions. A 3' activated deoxynucleoside, protected at the 5' hydroxyl with a photolabile group, is then provided to the surface such that coupling occurs at sites that had been exposed to light. Following oxidation, for molecular bond stabilization, and capping, to prevent subsequent unwanted (photo) chemical reactions, the substrate is rinsed and the surface is illuminated through a second mask to expose additional hydroxyl groups for coupling. A second 5' protected activated deoxynucleoside base is presented to the surface. The selective photodeprotection and coupling cycles are repeated to build up levels of bases until the desired set of probes is obtained. A variation of this process uses polymeric semiconductor photoresists, which are selectively patterned by photolithographic techniques, rather than using photolabile 5' protecting groups.

It may be possible to generate high density miniaturized arrays of oligonucleotide probes using such photolithographic techniques wherein the sequence of the oligonucleotide probe at each site in the array is known. These probes can then be used to search for complementary sequences on a target strand of DNA, with detection of the target that has hybridized to particular probes accomplished by the use of fluorescent markers coupled to the targets and inspection by an appropriate fluorescence scanning microscope.

A disadvantage of the approaches for light directed DNA synthesis that employ photolithographic masks is that four different lithographic masks are needed for each monomeric base, and the total number of different masks required are thus four times the length of the DNA probe sequences to be synthesized. The high cost of producing the many precision photolithographic masks that are required, and the multiple processing steps required for repositioning and alignment of the masks for every exposure, contribute to relatively high costs and lengthy processing times.

To overcome the limitations associated with using photolithographic masks for DNA synthesis, a method and apparatus for the synthesis of arrays of DNA probe sequences, polypeptides, and the like without photolithographic masks by using a dynamic mask image produced by an array of switchable optical elements, such as a two-dimensional array of electronically addressable micromirrors, has been developed. Each of the micromirrors can be selectively switched between one of at least two separate positions so as to contribute light to the mask image in a first position, and to deflect the light to an absorber in a second position. Projection optics receive the light reflected from the optical array and produce an image of the mirrors onto a flow cell or onto an array where the nucleotide addition reactions are conducted.

The image of the micromirrors projected onto the reaction site is generally that of a set of rectangular "pixels" corresponding to the outline of the micromirrors. Each pixel is either dark or brightly illuminated depending on the position of the corresponding mirror. Synthesis of the DNA probes, which occurs within the area of the imaged pixels, must be separated so that when the probes are scanned with an optical scanner, such as the fluorescence scanning microscope, to detect hybridization with sample DNA, the particular pixel where hybridization occurs can be unambiguously identified. The pixels are separated by dark "lanes" or "streets" corresponding to the spaces between the movable mirrors. These lanes, if clearly resolved in the image of the micromirrors at the reaction site, assist in distinguishing and identifying each pixel.

Various effects occurring during the process of light directed synthesis of a DNA microarray in the manner described can adversely affect the quality (purity) of the DNA sequences produced. The acquisition of DNA oligonucleotides from such DNA microarrays is a new expansion of the use of DNA microarrays from "gene expression" to "gene assembly". DNA microarray quality (purity) thus becomes increasingly important, due to the strong dependency of DNA assembly success on purity of the input (construction) DNA oligonucleotides.

Various methods for error reduction in light directed DNA microarray synthesis can be categorized roughly into two approaches, error reduction (removal) during synthesis and error correction after synthesis. An example of error reduction during synthesis is the use of capping during the synthesis process. During the base coupling step of the DNA synthesis process certain coupling sites that have been exposed to light and thus de-protected for coupling may remain uncoupled. After the coupling step, a capping reagent may be used to disable these sites permanently, to prevent unwanted (photo) chemical reactions at these sites later in the synthesis process that might otherwise result in the presence of unintended DNA sequences in the microarry. Examples of error correction after synthesis include elution processes and pre/post assembly processes.

In theory, light directed DNA synthesis occurs only at reactive regions of the substrate that are illuminated intentionally via the mask pattern. However, light scattering, flair, and diffraction are optical properties that are always present at exposure of the substrate upon which the DNA is to be synthesized. For example, diffraction effects form localized patterns depending on an array configuration. There is a gradual transition of exposure doses at the pixel edges of the mask pattern. Thus, areas of the substrate that are intended to remain inactive and that are near the edges of areas that are being intentionally exposed also will receive some light exposure due to diffraction. Scattering and flair result in a more uniform distribution of sequence errors. In general, the optical properties of light scattering, flair, and diffraction may result in exposure of areas of the substrate that are intended to remain inactive, i.e., where the exposure nominal value should be zero. This can result in deprotection of sites in unintended locations on the substrate and the possible synthesis of unintended DNA sequences at those locations, thereby adversely affecting the quality of the DNA synthesis. This effect of unwanted light exposure is accumulated, since the synthesis process requires repetitive cycles of optical masking and exposure. Thus, DNA synthesis errors due to these optical effects increase with the synthesis of longer DNA sequences.

Reduction of the adverse effects of light scattering, flair, and diffraction in light directed DNA synthesis can improve significantly the quality (purity) of the resulting DNA microarray. However, light scattering, flair and diffraction effects cannot be entirely eliminated in principle. Error reduction in light directed DNA synthesis by reducing such effects directly may be achieved only at great effort and expense by complicating optical exposure systems.

What is desired, therefore, is a system and method for light directed DNA synthesis wherein the errors in DNA synthesis caused by light scattering, flair, and diffraction are reduced significantly in-situ. Preferably such error reduction is achieved by eliminating to the greatest extent possible the effects of light scattering, flair and diffraction on the synthesis process without requiring the use of expensive and complicated optical systems.

SUMMARY OF THE INVENTION

In accordance with the present invention, the formation of unwanted DNA sequences during light directed DNA synthesis due to the effects of light diffraction, scattering, and flair is reduced significantly by "inverse" capping of defined inactive regions (topologically complimentary to the active regions) of a prepared substrate onto which the DNA microarray is to be formed. Inverse capping in accordance with the present invention is performed in situ as an initial step of the DNA synthesis process. Inverse capping is employed to disable permanently the intended inactive areas of the substrate. Thus, unintended exposure of such areas during the synthesis process due to light diffraction, scattering, and flair will have no effect, as any unwanted DNA synthesis in those areas is prevented. Synthesis errors are reduced accordingly, resulting in a higher quality (purer) DNA microarray.

A solid support, modified with photolabile protecting groups, forms the platform or substrate upon which a DNA, in a microarray format, is to be synthesized in a conventional manner. "Active" regions or areas of the substrate are defined as those locations at which DNA coupling is intended to occur during the synthesis process. "Inactive" regions or areas of the substrate are defined as those locations at which DNA synthesis is not intended to occur. Thus, no DNA should be formed on the substrate in the defined inactive regions.

In accordance with the present invention, prior to conventional light directed DNA synthesis, the prepared substrate is exposed using an inverted mask pattern of the intended active areas or pixels of the substrate. Thus, the intended inactive regions of the substrate are exposed and deprotected. Chemical capping of these unwanted deprotected areas, using conventional chemical capping reagents, disables the sites in these inactive areas permanently. After inverse capping in this manner the inverse capped substrate may be employed for light directed DNA synthesis in a conventional manner. Any DNA chain growth in the capped inactive areas is prevented, even if the capped areas are incidentally exposed due to diffraction, scattering or flair effects during such subsequent light directed DNA synthesis. Thus, the inactive regions of the substrate will truly be inactive and will not be the sources of errors. Overall DNA synthesis errors are, therefore, reduced, and DNA quality (purity) enhanced.

Inverse capping in accordance with the present invention may be performed using a conventional light directed DNA array synthesizer apparatus. Preferably such an apparatus that employs a controlled micromirror array to produce a virtual mask pattern is used.

Further objects, features and advantages of the invention will be apparent from the following detailed description when taken in conjunction with the accompanying drawings.

DETAILED DESCRIPTION OF THE DRAWINGS

DETAILED DESCRIPTION OF THE INVENTION

Figure 1:
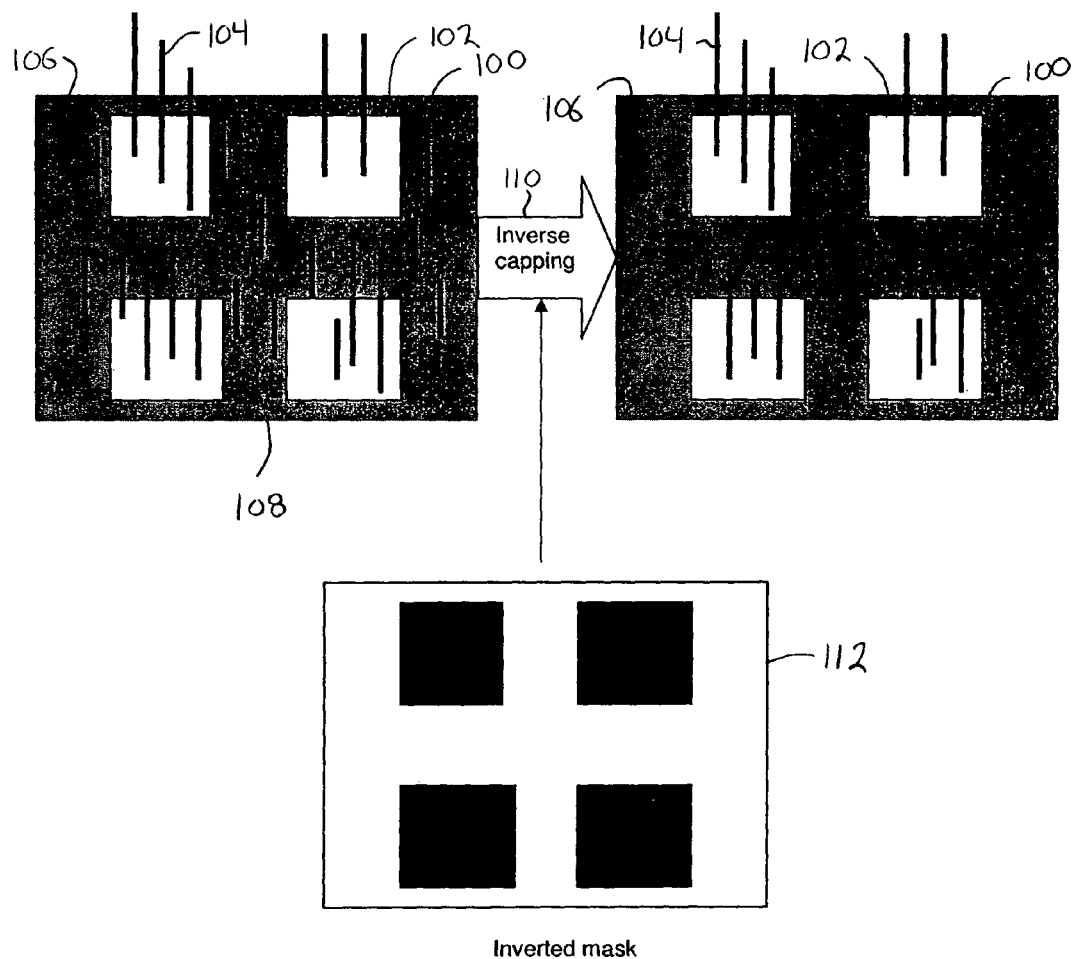
FIG. 1 is a schematic illustration of the basic concept and effect of inverse capping for synthesis error reduction in light directed DNA synthesis in accordance with the present invention.

In accordance with the present invention an "inverse" capping method is employed to reduce errors in light directed DNA synthesis resulting from diffraction, scattering and flare effects occurring during substrate exposure. The basic concept and effect of inverse capping in accordance with the present invention is illustrated in FIG. 1. In conventional light directed DNA synthesis DNA chains are grown on an appropriately prepared substrate surface 100. DNA synthesis is intended to occur only in defined active areas or pixels 102 of the substrate 100. These active areas 102 are exposed to light via a mask pattern to deprotect selected active areas 102 making them susceptible to DNA coupling, forming desired DNA chains 104 in the active regions 102 of the substrate 100. Due to diffraction, scattering, and flare, however, exposure of the active areas 102 of the substrate will also result in unintended exposure of intended inactive areas 106 of the substrate 100, where DNA synthesis is not intended to take place. As discussed above, unintended exposure of the intended inactive areas 106 of the substrate can result in deprotection of sites in those inactive areas 106 and the coupling and synthesis of unintended and unwanted DNA 108 in the intended inactive areas 106. This unwanted DNA 108 results in reduced quality (purity) of the DNA microarray being synthesized.

In accordance with the present invention, inverse capping 110 is performed at the beginning of the light directed DNA synthesis process to prevent the synthesis of unwanted DNA 108 in the intended inactive areas 106 of the substrate 100. Inverse capping 110 in accordance with the present invention begins by exposing the substrate 100 via an inverse mask pattern 112. The inverse mask pattern 112 defines the intended active areas 102 of the substrate 100, where DNA synthesis is intended to occur, by providing for the exposure of the intended inactive 106 areas of the substrate 100, where DNA synthesis should not occur. Thus, after exposure via the inverse mask pattern 112, the intended inactive areas 106 of the substrate are deprotected. Chemical capping of these deprotected areas, using conventional capping reagents, disables the sites in the intended inactive 106 area of the substrate 100 permanently. Conventional light directed DNA synthesis using the inverse capped substrate may then proceed normally. Even if the inactive area 106 of the substrate 100 is exposed during subsequent DNA synthesis processes, since the inactive capped area 106 is permanently disabled, no unwanted DNA synthesis will occur in the inactive 106 area of the substrate 100. After inverse capping in accordance with the present invention, the only available regions for DNA synthesis are the defined active regions 102, thus preventing the possibility of sequence errors in the capped area 106. Thus, inverse capping 110 in accordance with the present invention provides for error reduction in light directed DNA synthesis, resulting in a higher quality DNA microarray where unwanted DNA coupling 108 is reduced significantly.

The present invention will be described in further detail herein with reference to light directed DNA synthesis systems and methods using a controlled micromirror array to expose a prepared substrate surface in a desired mask pattern (a virtual mask). It should be understood, however, that inverse capping in accordance with the present invention may be employed with other methods and systems for light directed DNA synthesis that employ other masking structures and methods, including such systems and methods that employ more conventional photolithographic masks for substrate exposure patterning. In general, inverse capping in accordance with the present invention may be employed in any DNA synthesis system and method wherein reduction of the synthesis errors resulting from light diffraction, scattering, and flare during substrate exposure is desired.

The present invention will be described in further detail herein with reference to the synthesis of DNA microarrays on a substantially flat prepared substrate surface. It should be understood, however, that the present invention is applicable to light directed DNA synthesis on non-flat, such as curved or spherical, substrates as well.

The present invention will be described in detail herein with reference to light directed DNA synthesis. However, it should be understood that the present invention is applicable to light directed synthesis of any other biochemical molecules.

Inverse capping in accordance with the present invention may be performed using a conventional light directed DNA array synthesizer apparatus. Several exemplary apparatus of this type now will be described briefly.

Figure 2:
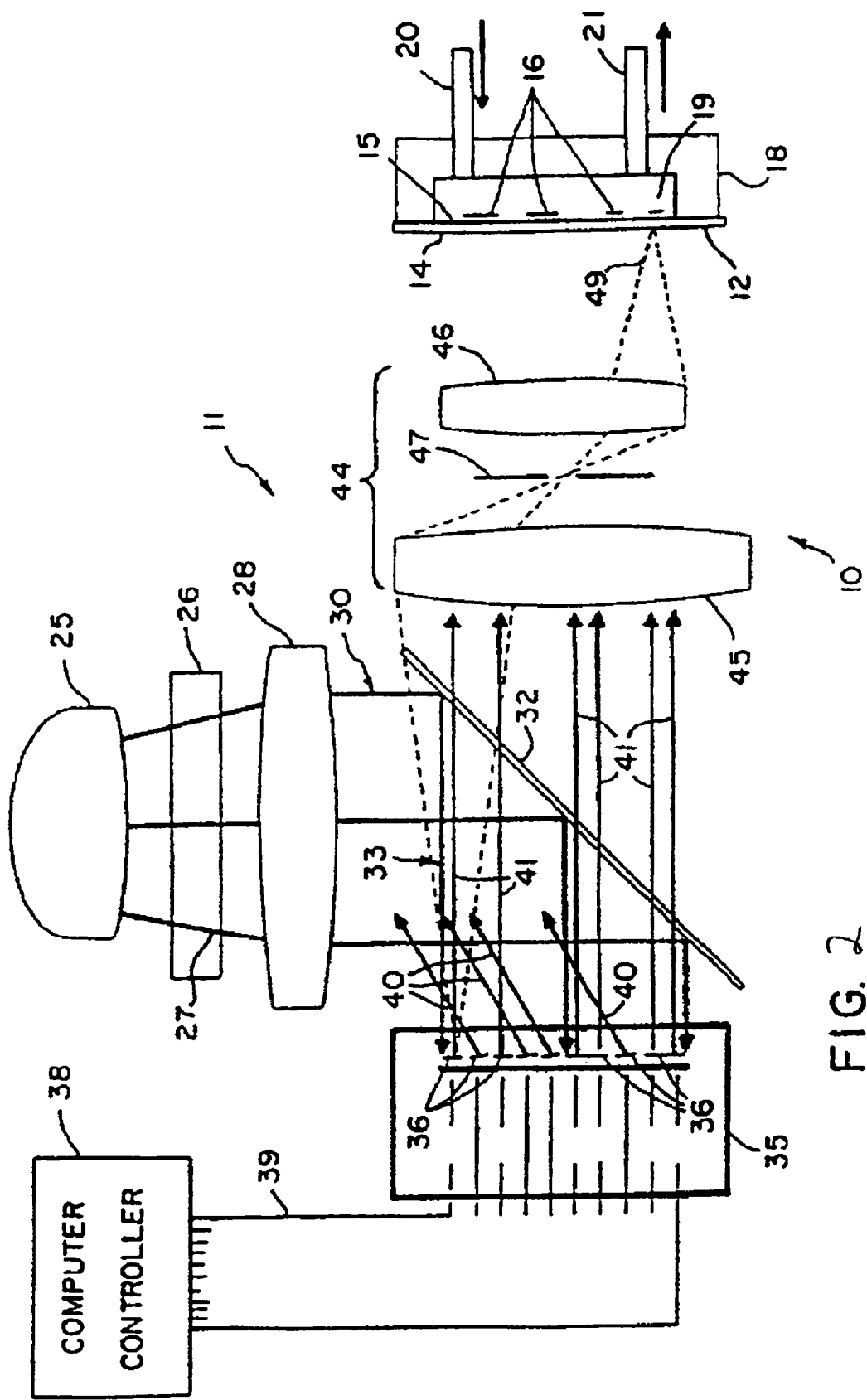
FIG. 2 is a schematic view of an array synthesizer apparatus that may be used for inverse capping and DNA microarray synthesis in accordance with the present invention.

With reference to the drawings, one exemplary apparatus that may be used for inverse capping and DNA synthesis in accordance with the present invention is shown generally at 10 in FIG. 2. This system 10 uses a flow cell with a single reaction chamber and a micromirror light array for substrate patterning. The apparatus includes a two-dimensional array image former 11 and a substrate 12 onto which the array image is projected by the image former 11. For the configuration shown in FIG. 2, the substrate has an exposed entrance surface 14 and an opposite active surface 15 on which, for example, a two-dimensional array of nucleotide sequences 16 are to be fabricated. The substrate 12 is mounted in a flow cell reaction chamber 18 enclosing a volume 19 into which reagents can be provided through an input port 20 and an output port 21. However, the substrate 12 may be utilized in the present system and method with the active surface 15 of the substrate facing the image former 11 and enclosed within a flow cell with a transparent window to allow light to be projected onto the active surface. The invention may also use an opaque or porous substrate. The reagents may be provided to the ports 20 and 21 from a conventional DNA oligonucleotide synthesizer (not shown in FIG. 2).

The image former 11 allows for the direction of light from a light source 25 along an optical light path and into the flow cell reaction chamber 18 so that nucleotide addition reactions may occur in accordance with a pre-selected pattern. The image former 11 includes the light source 25 (e.g., an ultraviolet or near ultraviolet source such as a mercury arc lamp), an optional filter 26 to receive the output beam 27 from the source 25 and selectively pass only the desired wavelengths (e.g., the 365 nm Hg line), and a condenser system 28 for forming a collimated beam 30. Other devices for filtering or monochromating the source light, e.g., diffraction gratings, dichroic mirrors, and prisms, may also be used rather than a transmission filter, and are generically referred to as "filters" herein.

In one embodiment, the beam 30 is projected onto a beam splitter 32 (pellicle or glass) which reflects a portion of the beam 30 into a beam 33 which is projected onto an array of optical elements 35. To use a light switch at normal incidence, a device that allows illumination and image formation at the same time is necessary. With devices allowing an angular deflection, this is not necessary since a side illumination can be used.

The optical array 35 is preferably a two-dimensional array of small or miniature optical elements which are operable under electronic control such that they may be operated by the output of a general purpose digital computer 38 connected to the optical array 35. The optical array 35 must include optical elements which are capable of, in effect, switching light in amplitude, direction, or other attribute of the light, sufficient to change a portion of the incident light from one state where that portion of the light actuates a reaction occurring in one cell on the substrate 12 in the flow cell 18. There are several examples of optical devices which can serve as the optical array 35. One is an array of micromirrors, which is a preferred example as described further in much greater detail immediately below. Other types of suitable optical arrays include without limitation microshutters, micromirrors operated by bimorph piezoelectric actuators, LCD shutters, and reflective LCD devices.

Figure 3:
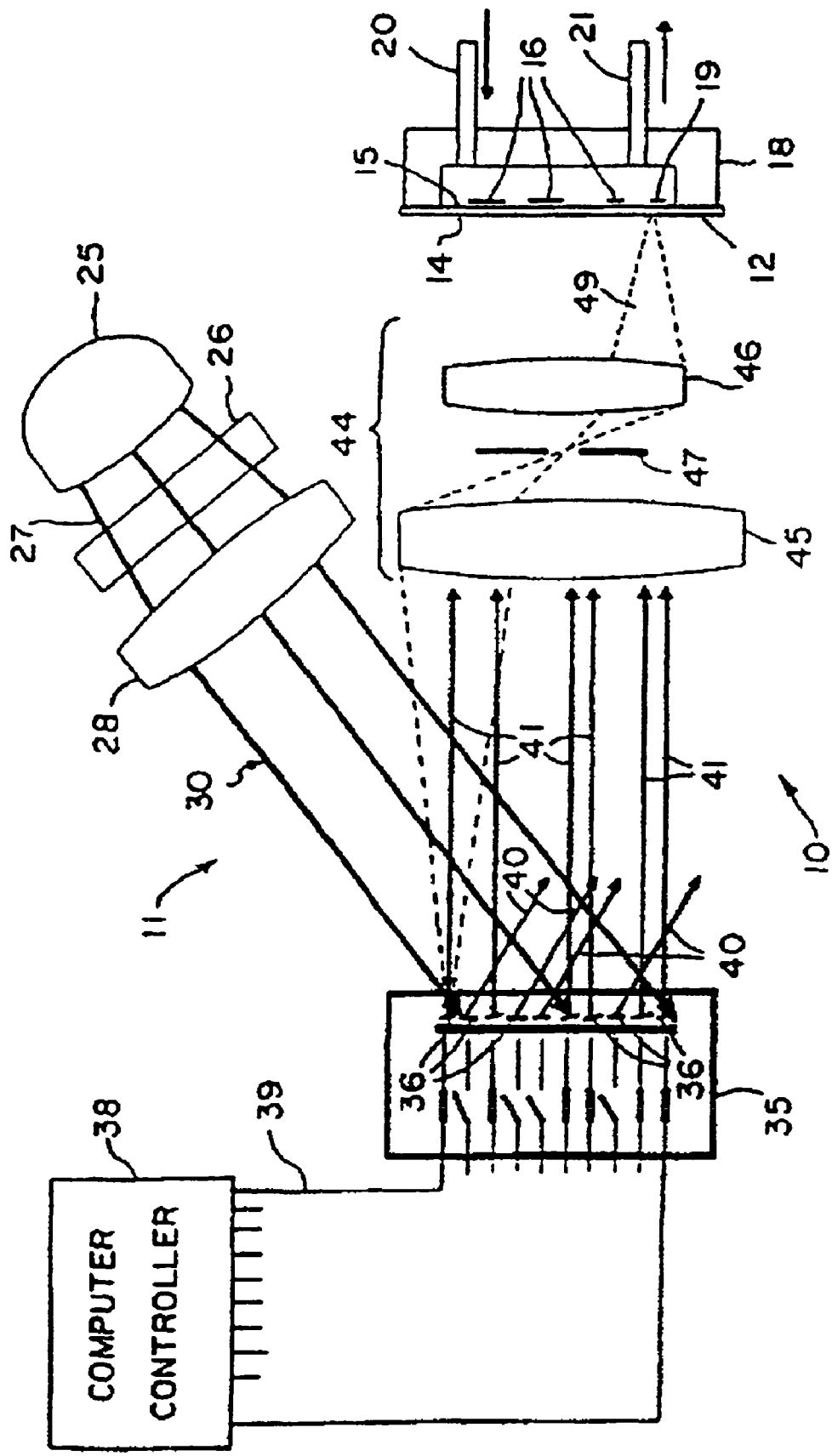
FIG. 3 is a schematic view of another array synthesizer apparatus that may be used for inverse capping and DNA microarray synthesis in accordance with the present invention.

A micromirror array device employed as the optical array 35 is illustrated in FIGS. 2 and 3. The micromirror array device 35 has a two-dimensional array of individual micromirrors 36 which are each responsive to control signals supplied to the array device 35 to tilt in one of at least two directions. Control signals are provided from a computer controller 38 on control lines 39 to the micromirror array device 35. The micromirrors 36 are constructed so that in a first position of the mirrors the portion of the incoming beam of light 33 that strikes an individual micromirror 36 is deflected in a direction oblique to the incoming beam 33, as indicated by the arrows 40. In a second position of the mirrors 36, the light from the beam 33 striking such mirrors in such second position is reflected back parallel to the beam 33, as indicated by the arrows 41. The light reflected from each of the mirrors 36 constitutes an individual beam 41. Other types of suitable devices include phase controlling switches, such as variable gratings or variable height systems.

The multiple beams 41 are incident upon the beam splitter 32 and pass through the beam splitter with reduced intensity and are then incident upon projection optics 44 indicated conceptually by lenses 45 and 46 and optional adjustable iris 47, but not limited to this. The projection optics 44 serve to form an image of the pattern of the micromirror array 35, as represented by the individual beams 41 (and the dark areas between these beams), on the active surface 15 of the substrate 12. The outgoing beams 41 are directed along a main optical axis of the image former 11 that extends between the micromirror device and the substrate. The substrate 12 in the configuration shown in FIG. 2 is transparent, e.g., formed of fused silica or soda lime glass or quartz, so that the light projected thereon, illustratively represented by the lines labeled 49, passes through the substrate 12 without substantial attenuation or diffusion.

A preferred micromirror array 35 is the Digital Light Processor (DLP) available commercially from Texas Instruments, Inc. These devices have arrays of micromirrors (each of which is substantially a square with edges of 10 to 20 μm in length) which are capable of forming patterned beams of light by electronically addressing the micromirrors in the arrays. Such DLP devices are typically used for video projection and are available in various array sizes, e.g., 640×800 micromirror elements (512,000 pixels), 640×480 (VGA; 307,200 pixels), 800×600 (SVGA; 480,000 pixels); and 1024×768 (XGA 786,432 pixels).

The micromirrors 36 of such devices are capable of reflecting the light of normal usable wavelengths, including ultraviolet and near ultraviolet light, in an efficient manner without damage to the mirrors themselves. The window of the enclosure for the micromirror array preferably has anti-reflective coatings thereon optimized for the wavelengths of light being used. Utilizing commercially available 600×800 arrays of micromirrors, encoding 480,000 pixels, with typical micromirror device dimensions of 16 microns per mirror side and a pitch in the array of 17 microns, provides total micromirror array dimensions of 13,600 microns by 10,200 microns.

The magnification of the optics can be designed to provide any final chip or image size. For instance, by using a reduction factor of 5 through the optics system 44, a typical and readily achievable value for a lithographic lens, the dimensions of the image projected onto the substrate 12 are thus about 2,220 microns by 2,040 microns, with a resolution of about 2 microns. This resolution can be accommodated by using only every other mirror of the micromirrors 36. Larger images can be exposed on the substrate 12 by utilizing multiple side-by-side exposures (by either stepping the flow cell 18 or the image projector 11), or by using a larger micromirror array. It is also possible to do one-to-one imaging without reduction as well as enlargement of the image on the substrate, if desired.

Preferably, however, since the micromirror size is congruent with the requirements of a DNA microarray, a simple 1× system can be used. This system has the advantage of simplicity, low aberration and large field of view.

The projection optics 44 may be of standard design, since the images to be formed are relatively large and well away from the diffraction limit. The lenses 45 and 46 focus the light in the beam 41 passed through the adjustable iris 47 onto the active surface of the substrate. The projection optics 44 and the beam splitter 32 are arranged so that the light deflected by the micromirror array away from the main optical axis (the central axis of the projection optics 44 to which the beams 41 are parallel), illustrated by the beams labeled 40 (e.g., 10 or 12 degrees off axis) fall outside the entrance pupil of the projection optics 44 (typically 0.5/5=0.1; 10 degrees corresponds to an aperture of 0.17, substantially greater than 0.1). The iris 47 is used to control the effective numerical aperture (NA) and to ensure that unwanted light (particularly the off-axis beams 40) are not transmitted to the substrate. Resolution of dimensions as small as 0.5 microns are obtainable with such optics systems. Such resolution may separate adjacent mirrors of the micromirrors 36. For manufacturing applications, the micromirror array 35 may be located at the object focal plane of a lithographic I-line lens optimized for 365 nm. Such lenses typically operate with a numerical aperture (NA) of 0.4 to 0.5, and have a large field capability.

The micromirror array device 35 may be formed with a single line of micromirrors (e.g., with 2,000 mirror elements in one line) which is stepped in a scanning system. In this manner the height of the image is fixed by the length of the line of the micromirror array but the width of the image that may be projected onto the substrate 12 is essentially unlimited. By moving the flow cell 18 which carries the substrate 12, the mirrors can be cycled at each indexed position of the substrate to define the image pattern at each new line that is imaged onto the substrate active surface.

Various approaches may be utilized in the fabrication of the DNA 16 on the substrate 12, and are adaptations of microlithographic techniques. In a "direct photofabrication approach," the glass substrate 12 is coated with a layer of a chemical capable of binding the nucleotide bases. Light is applied by the projection system 11, deprotecting the OH groups on the substrate and making them available for binding to the bases. After development, the appropriate nucleotide base is flowed into the flow cell and onto the active surface of the substrate and binds to the selected sites using normal phosphoramidite DNA synthesis chemistry. The process is then repeated, binding another base to a different set of locations. The process is simple, and if a combinatorial approach is used, the number of permutations increases exponentially. The resolution limit is presented by the linear response of the deprotection mechanism. Because of the limitations in resolution achievable with this method, methods based on photoresist technology may be used instead. In the indirect photofabrication approach, compatible chemistries exist with a two-layer resist system, where a first layer of, e.g., polyimide acts as a protection for the underlying chemistry, while the top imaging resist is an epoxy-based system. The imaging step is common to both processes, with the main requirement being that the wavelength of light used in the imaging process be long enough not to excite transitions (chemical changes) in the nucleotide bases (which are particularly sensitive at 280 nm). Hence, wavelengths longer than 300 nm should be used. 365 nm is the I-line of mercury, which is the one used most commonly in wafer lithography.

Another form of the array synthesizer apparatus 10 that may be used for inverse capping and DNA synthesis in accordance with the present invention is shown in a simplified schematic view in FIG. 3. In this arrangement, the beam splitter 32 is not used, and the light source 25, optional filter 26, and condenser system 28 are mounted at an angle to the main optical axis (e.g., at 20 degrees to the axis) to project the beam of light 30 onto the array of micromirrors 36 at an angle. In this preferred orientation of the light source 25, the micromirrors 36 are oriented to reflect the light 30 into off axis beams 40 in a first position of the mirrors and into beams 41 along the main axis in a second position of each mirror. In other respects, the array synthesizer of FIG. 3 is the same as that of FIG. 2.

Figure 4:
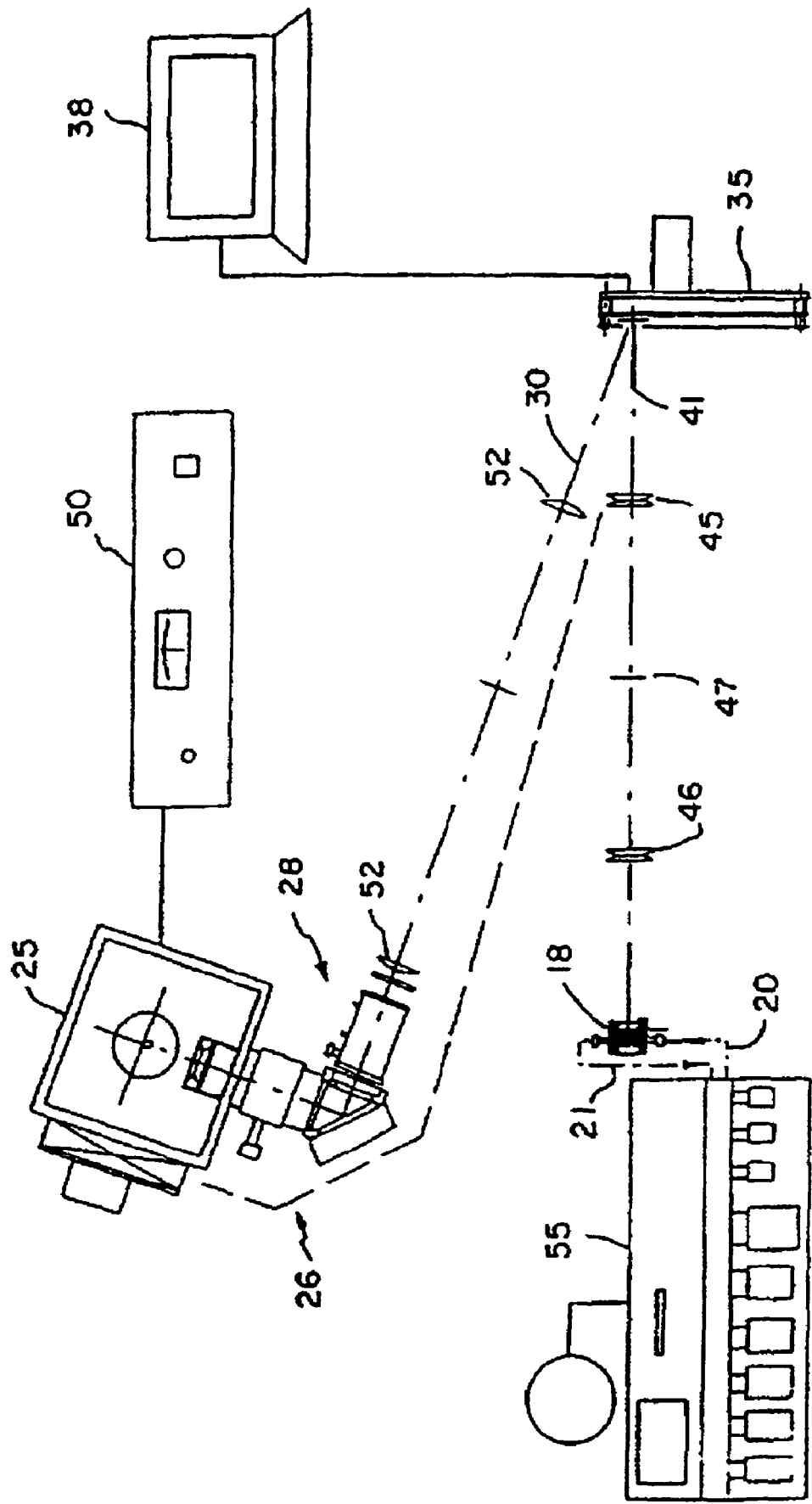
FIG. 4 is a more detailed schematic view of a general telecentric array synthesizer apparatus that may be used for inverse capping and DNA microarray synthesis in accordance with the present invention.
Figure 5:
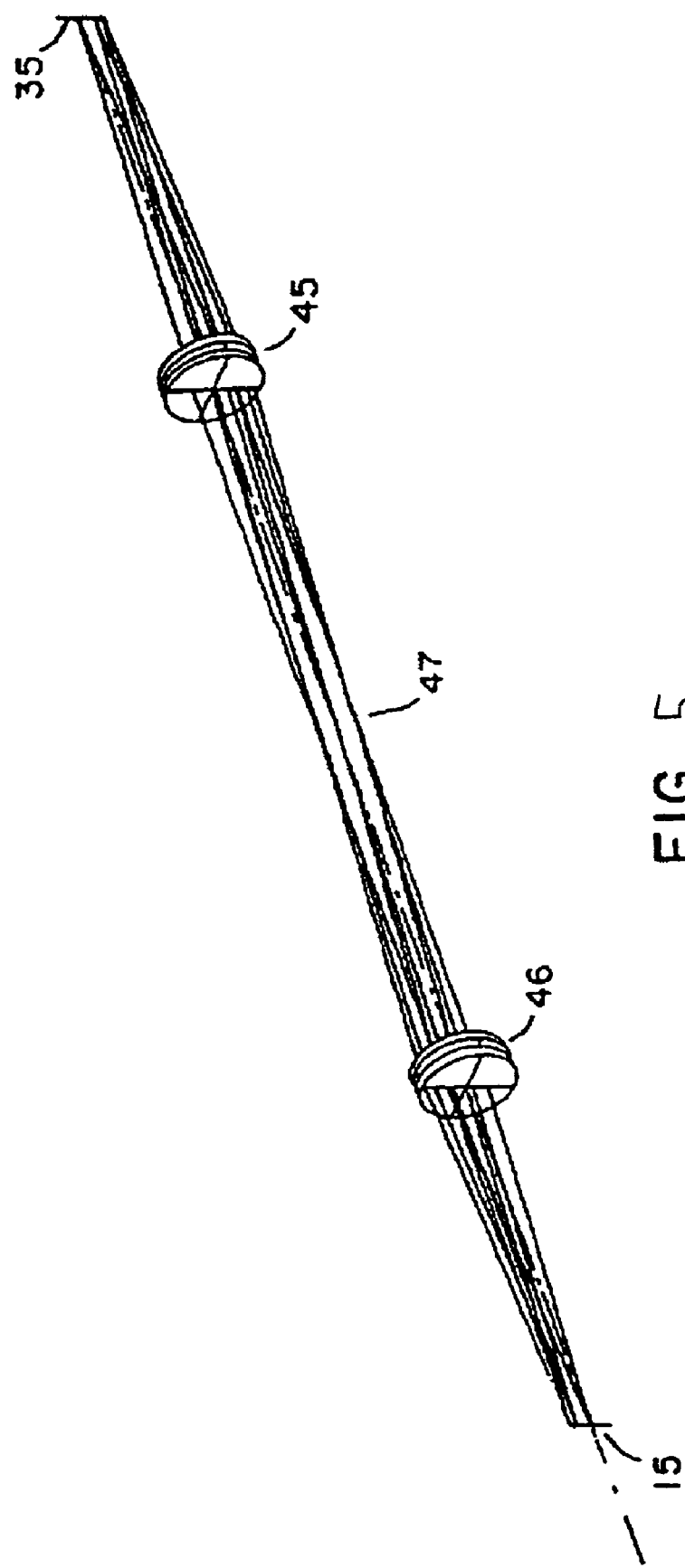
FIG. 5 is an illustrative ray diagram for the refractive optics of the apparatus of FIG. 4.

A more detailed view of an array synthesizer apparatus which uses the preferred off-axis projection arrangement of FIG. 3 is shown in FIG. 4. Exemplary refractive optics as used in such an apparatus are shown in FIG. 5. In a simple implementation of the apparatus of FIG. 4, the source 25 (e.g., 1,000 W Hg arc lamp, Oriel 6287, 66021), provided with power from a power supply 50 (e.g., Oriel 68820), is used as the light source which contains the desired ultraviolet wavelengths. The filter system 26 is composed, for example, of a dichroic mirror (e.g., Oriel 66226) that is used to absorb infrared light and to selectively reflect light of wavelengths ranging from 280 to 400 nm. A water-cooled liquid filter (e.g., Oriel 6127) filled with deionized water is used to absorb any remaining infrared. A colored glass filter (Oriel 59810) or an interference filter (Oriel 56531) may be used to select the 365 nm line of the Hg lamp 25 with a 50% bandwidth of either 50 nm or 10 nm, respectively. An F/1 two element fused silica condenser (Oriel 66024) may be used as the condenser system 28, and with two plano-convex lenses 52 (Melles Griot 01LQP033 and Melles Griot 01LQP023), forms a Kohler illumination system. This illumination system produces a roughly collimated uniform beam 30 of 365 nm light with a diameter just large enough to encompass the 16 mm×12 mm active area of the micromirror array device 35. This beam 30 is incident onto the device 35 at an angle of 20 degrees measured from the normal to the face of the device. It will be clear to one of ordinary skill in the art that many other illumination systems are possible. The micromirror array device 35 is located approximately 700 mm away from the last filter. When the micromirrors are in a first position, the light in the beam 30 is deflected downwardly and out of the system. For example, in this micromirror device the mirrors in their first position may be at an angle of −10 degrees with respect to the normal to the plane of the micromirrors to reflect the light well away from the optical axis. When a micromirror is controlled to be deflected in a second position, e.g., at an angle of +10 degrees with respect to the normal to the plane of the micromirrors, the light reflected from such micromirrors in the second position emerges perpendicularly to the plane of the micromirror array in the beam 41.

Figure 6:
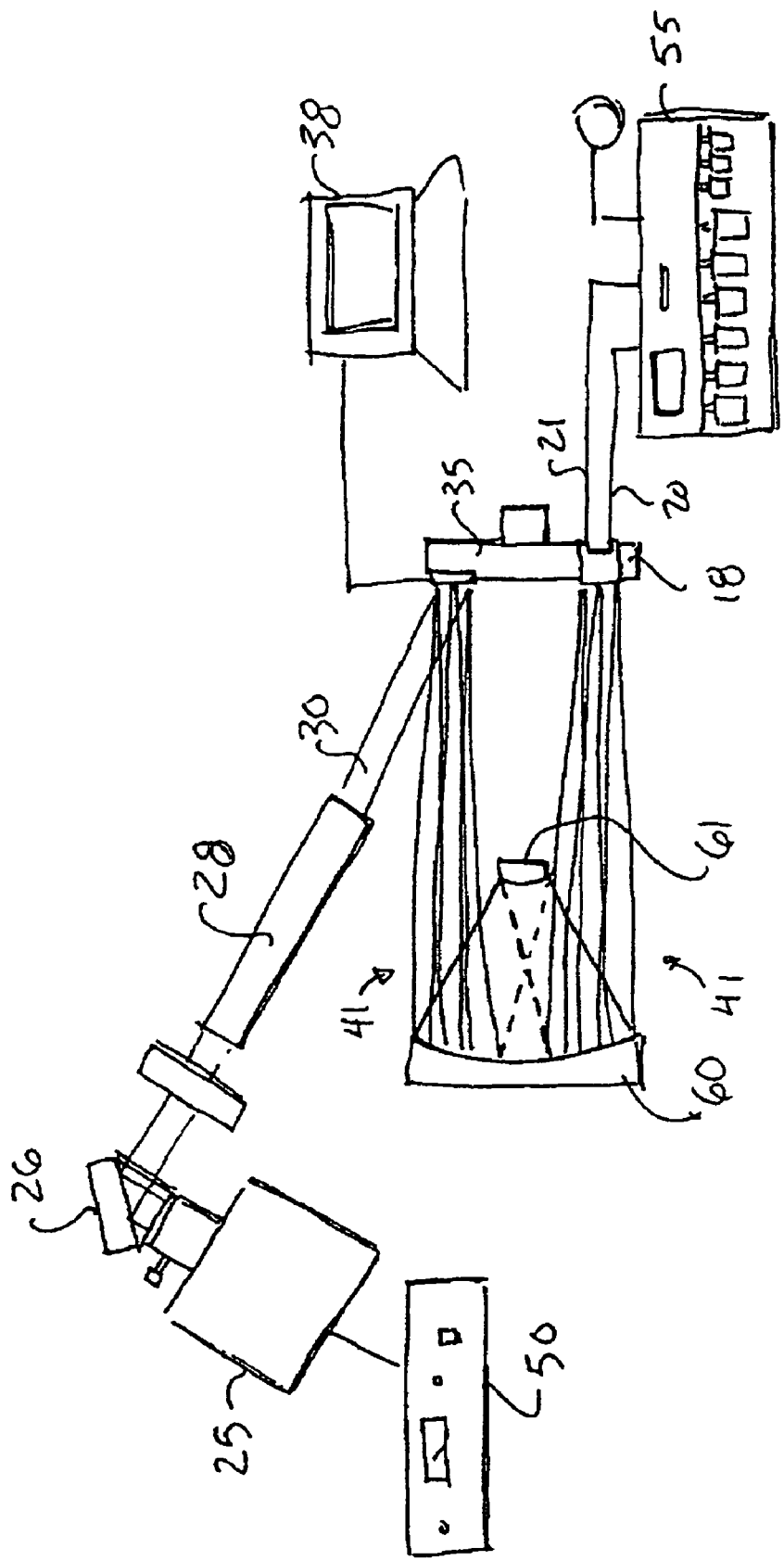
FIG. 6 is a schematic view of a further embodiment of an array synthesizer apparatus that may be used for inverse capping and DNA microarray synthesis in accordance with the present invention in which telecentric reflective optics are utilized.

In a preferred embodiment, an array synthesizer apparatus may use reflective optics as shown in FIG. 6. Importantly, the reflective optics reduce scatter associated with lenses providing a higher contrast image. An exemplary system utilizes a 1,000 W Hg arc lamp 25 as a light source (e.g., Oriel 6287, 66021), with a filter system formed of a dichroic mirror (e.g., Oriel 66228) that absorbs infrared light and selectively reflects light of wavelengths ranging from 350 to 450 nm. An F/1 two element fused silica condenser lens (Oriel 66024) is used to produce a roughly collimated beam of light 30 containing the 365 nm line but excluding undesirable wavelengths around and below 300 nm. A Kohler illumination system may optionally also be used in the apparatus of FIG. 6 to increase uniformity and intensity. The beam 30 is incident onto the micromirror array device 35 which has an active area of micromirrors of about 16 mm×12 mm and which is located about 210 nm from the snout of the UV source 25, with the beam 30 striking the planar face of the micromirror device 35 at an angle of 20 degrees with respect to a normal to the plane of the array. The light reflected from the micromirrors in a first position of the micromirrors, e.g., −10 degrees with respect to the plane of the array, is directed out of the system, whereas light from micromirrors that are in a second position, e.g., +10 degrees with respect to the plane of the array, is directed in the beam 41 toward a reflective telecentric imaging system composed of a concave mirror 60 and a convex mirror 61. Both mirrors are preferably spherical and have enhanced UV coating for high reflectivity although spherical shapes are possible as well. After executing reflections from the mirrors 60 and 61, the beam 41 is imaged onto the active surface of a glass substrate enclosed in the flow cell 18. In this case the flow cell 18 is co-planar with the micromirrors to complete a Offner optical system.

The convex mirror defines the aperture of the system. Since the pupil is also located at the convex mirror surface, the system is telecentric. The telecentricity prevents spatial distortion of the image with slight focal distance variations for example when the micromirrors and flow cell 18 are not perfectly co-planar. The beam 41 first strikes the concave mirror, then the convex mirror, and then the concave mirror again to direct it to the flow cell 18. For the system shown, the concave mirror 60 may have a diameter of 152.4 mm, and a spherical mirror surface radius of 304.8 mm (ES F43561), and the convex mirror may have a diameter of 25 mm, and a spherical mirror surface radius of 152.94 mm (ES F45625). Ideally, the radius of curvature of the concave mirror is close to twice that of the convex mirror. Such reflective optical systems are well known and conventionally used in optical lithography.

Figure 7:
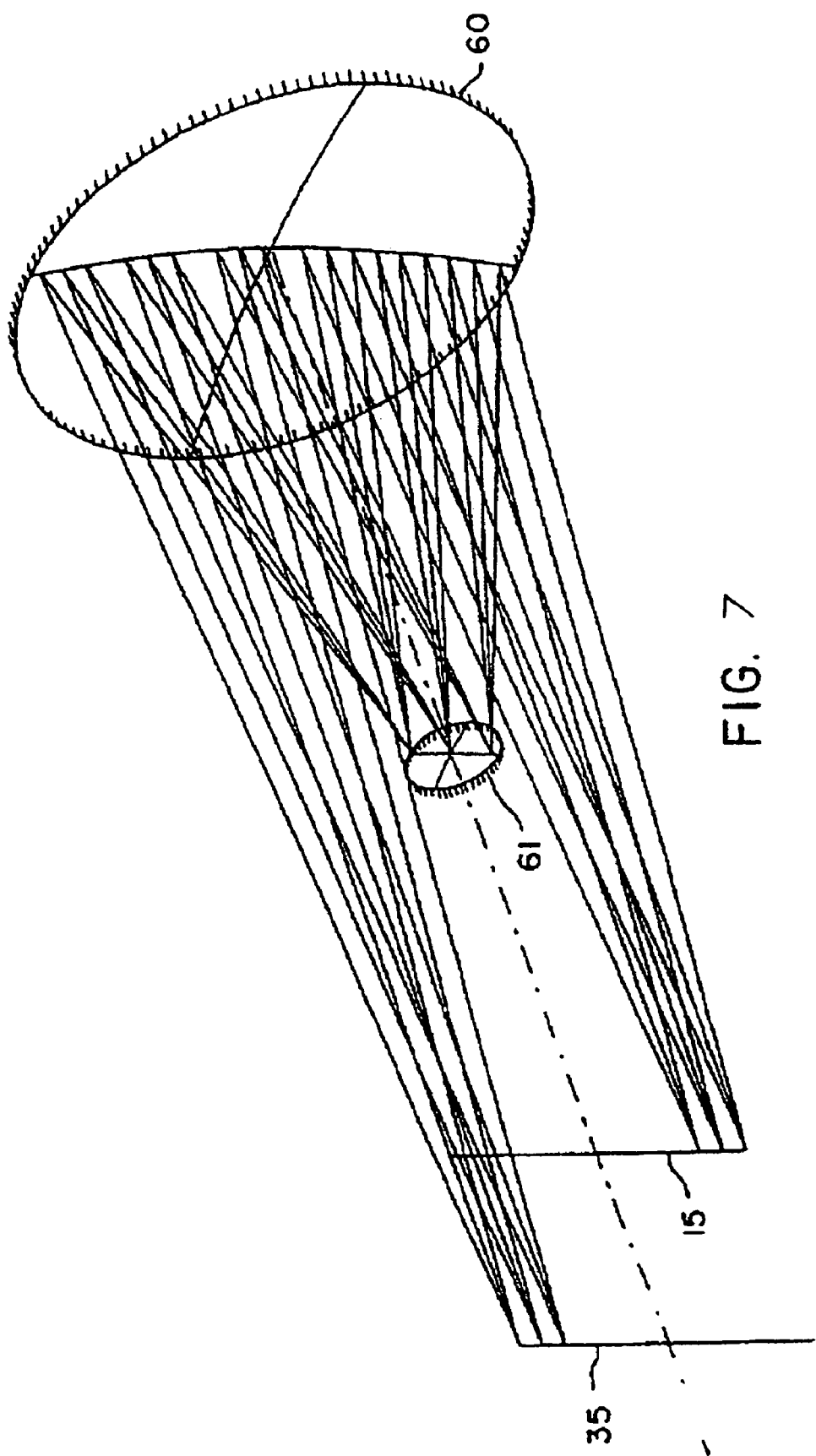
FIG. 7 is an illustrative ray diagram for the reflective optics of the apparatus of FIG. 6.

FIG. 7 illustrates image formation for the preferred optical system of FIG. 6. Fans of rays originating in the center of the object (the micromirror array device), at the edge, and at an intermediate position are shown in FIG. 7. The rays reflect first from the concave mirror 60, then from the convex mirror 61, then from the concave mirror 60 again, to form an inverted image of the face of the micromirror array device.

The refractive or reflective optical systems are both designed to minimize aberrations such as coma and spherical aberration via cancellation. Both of the telecentric optical systems of FIGS. 4 and 6 are 1:1 imaging systems. A reflective system has the potential advantages of eliminating chromatic aberration allowing alignment of the system using visible light, as well as being compact and less expensive. Another preferred system for doing 1:1 imaging would be a Wynne-Dyson type system which combines concave mirror with lenses and prisms.

Figure 8:
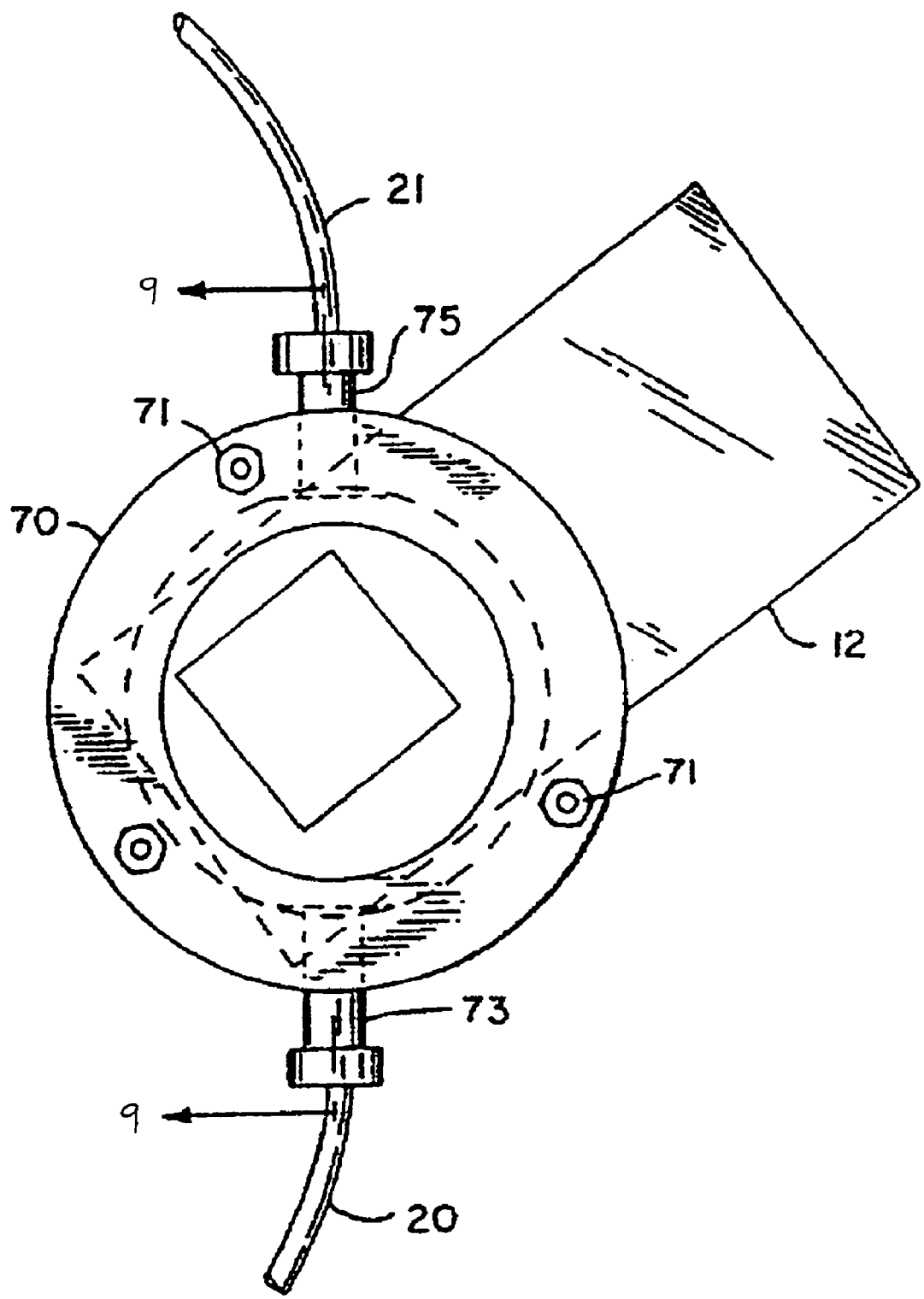
FIG. 8 is a top plan view of a reaction chamber flow cell which may be utilized in an array synthesizer apparatus that may be used for inverse capping and DNA microarray synthesis in accordance with the present invention to form a DNA array directly on a substrate.
Figure 9:
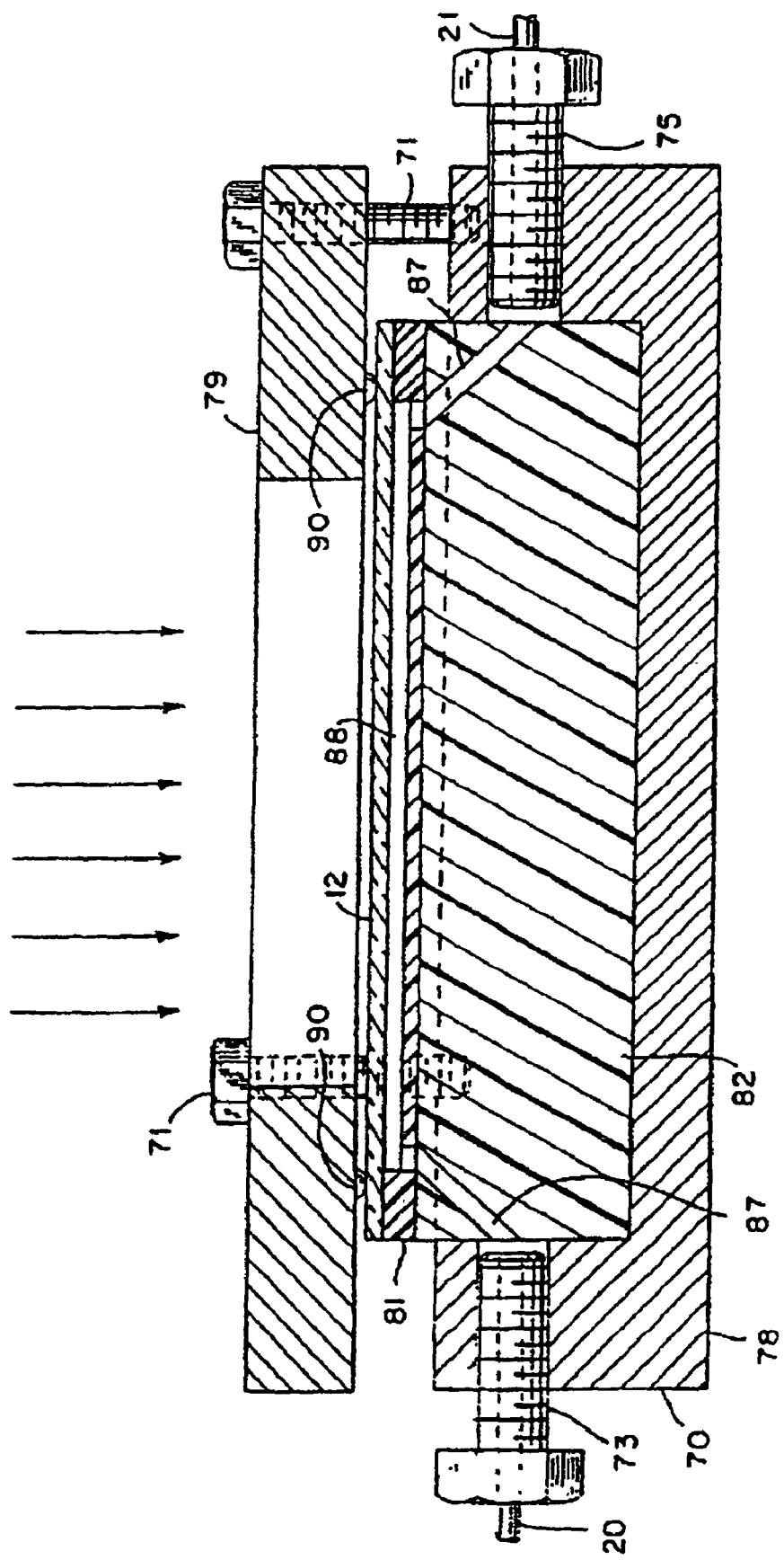
FIG. 9 is a cross-sectional view through the reaction chamber flow cell of FIG. 8, taken generally along the lines 9-9 of FIG. 8.
Figure 10:
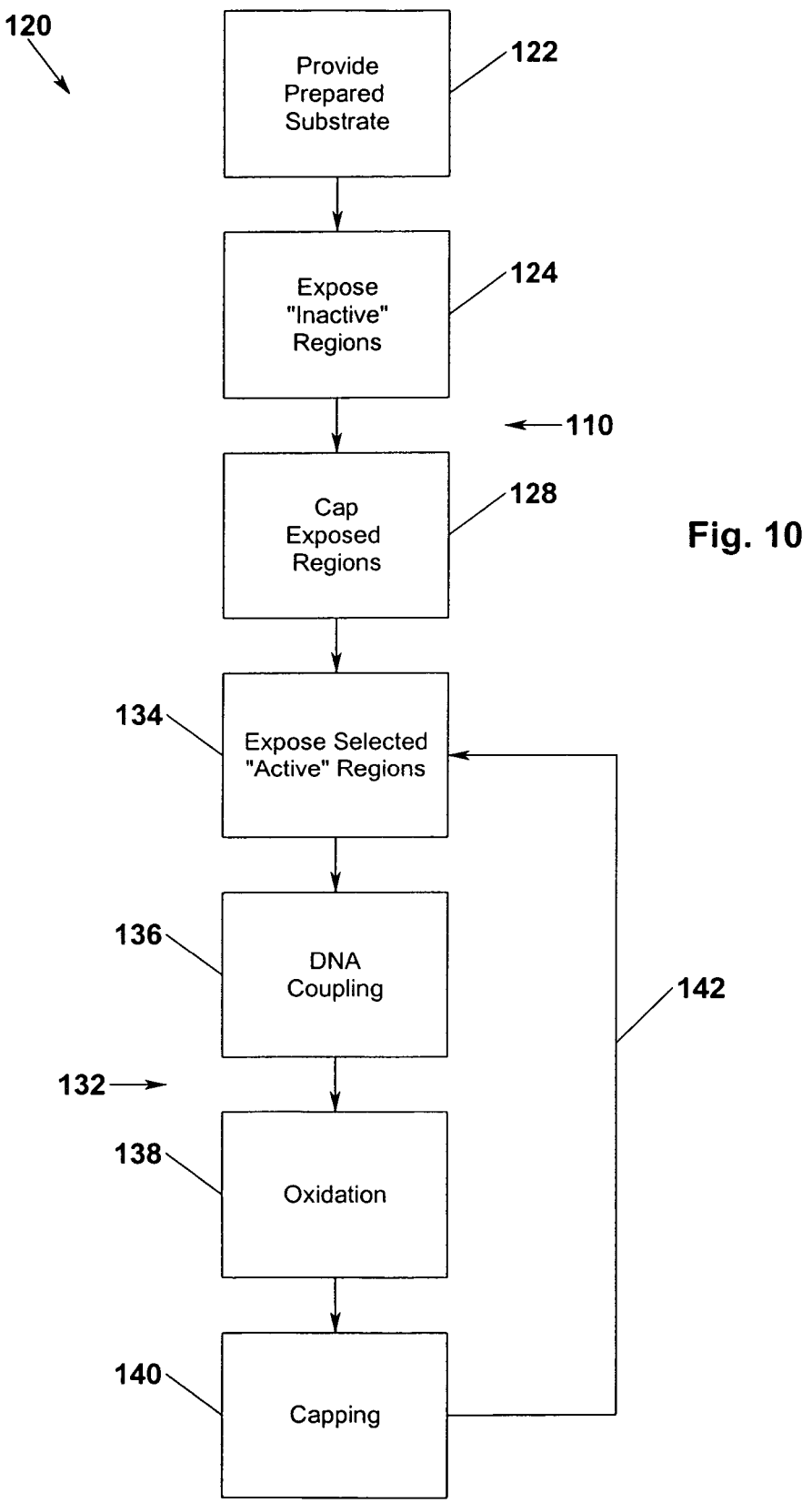
FIG. 10 is a flow chart diagram illustrating exemplary steps in a method for light directed DNA synthesis employing inverse capping for error reduction in accordance with the present invention.

More detailed views of an exemplary flow cell which may be utilized with a synthesizer apparatus to form a DNA microarray using inverse capping for error reduction in accordance with the present invention is shown in FIGS. 8 and 9. The exemplary flow cell 18 in FIGS. 8 and 9 may be used to synthesize DNA directly on a substrate and includes an aluminum housing 70, held together by bolts 71, having an inlet 73 connected to an input port line 20 and an outlet 75 connected to an output port line 21. As illustrated in the cross-sectional view of FIG. 9, the housing 70 includes a lower base 78 and an upper cover section 79 which are secured together over the substrate with the bolts 71. The substrate 12, e.g., a transparent glass slide, is held between the upper plate 79 and a cylindrical gasket 81 (e.g., formed of Kal RezJ), which in turn is supported on a nonreactive base block 82 (e.g., TeflonJ), with an inlet channel 85 extending from the inlet 73 to a sealed reaction chamber 88 formed between the substrate 12 and the base block 82 that is sealed by the gasket, and with an outlet channel 89 extending from the reaction chamber 88 to the outlet 75. The bolts 71 can be screwed and unscrewed to detachably secure the substrate 12 between the cover section and the base to allow the substrate to be replaced with minimal displacement of the base of the flow cell. Preferably, as shown in FIG. 9, a rubber gasket 90 is mounted at the bottom of the plate 79 to engage against the substrate at a peripheral region to apply pressure to the substrate against the gasket 81. If desired, the flow cell may also be used as a hybridization chamber during readout.

An exemplary method 120 for light directed DNA synthesis using inverse capping 110 for error reduction in accordance with the present invention now will be described in more detail with reference to the flow chart diagram of FIG. 10, and FIGS. 11-17 which follow. The exemplary method 120 described may be implemented using an array synthesizer apparatus of the type illustrated and described herein or any other current or present conventional light directed DNA synthesis apparatus or system.

Figure 11:
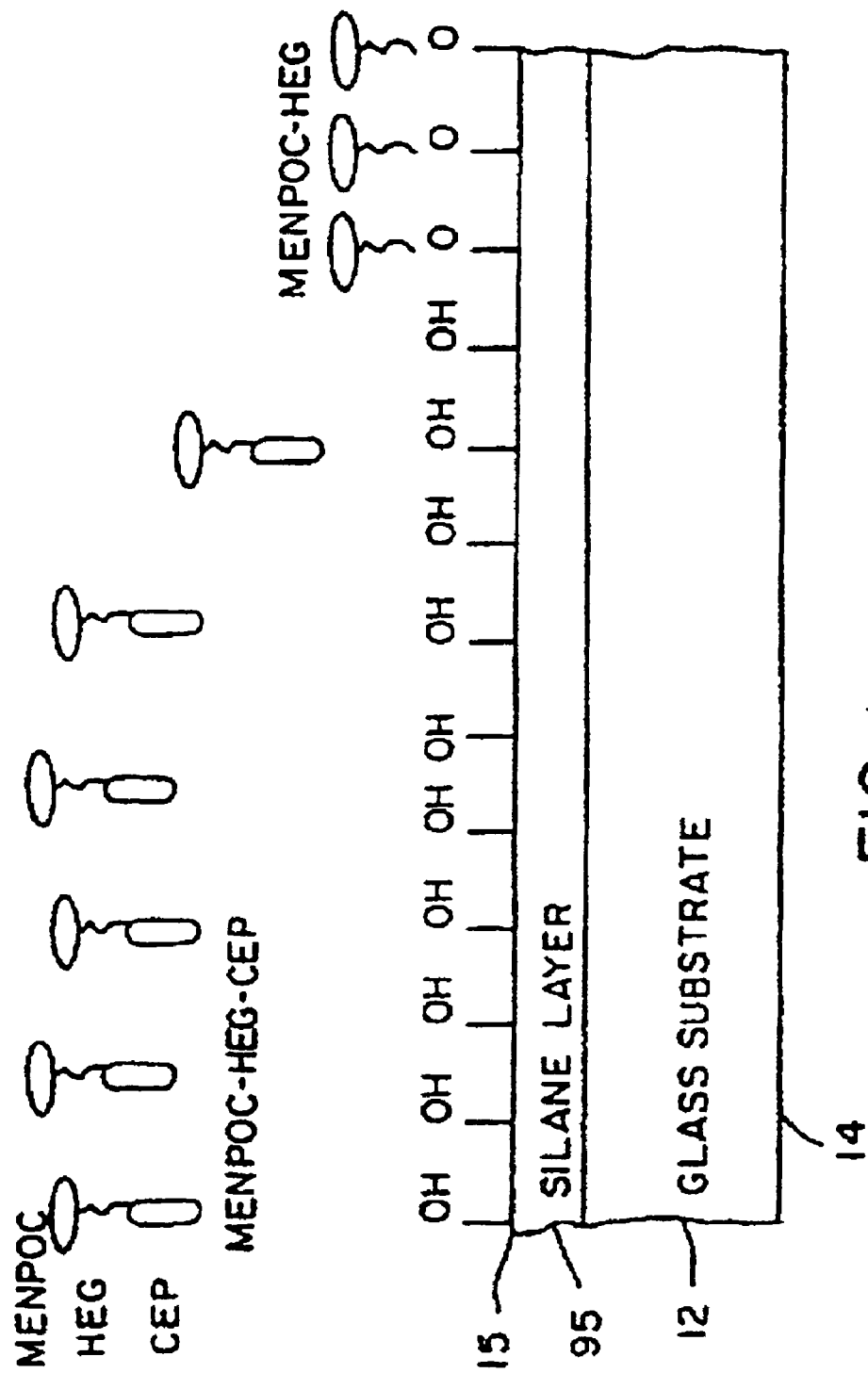
FIG. 11 is an illustrative view showing the coating of a substrate with a photolabile linker molecule.

Light directed DNA synthesis begins with providing 122 a substrate 12 that is prepared in the conventional manner for the light directed synthesis of DNA thereon. For example, FIG. 11 illustrates the preparation of such a substrate by the coating of a substrate 12, having a silane layer 95 forming the active surface 15 thereof, with the photolabile linker molecule, e.g., MENPOC-HEG coated on the silane layer using standard phosphoramidite chemistry. MENPOC-HEG-CEP=18-O—[(R,S)-(1-(3,4-(Methylened-ioxy)-6-nitrophenyl)ethoxy)carbonyl]-3,6,9,12,15,18-hexaoxaoctadec-1-yl O.sup.-2-cyanoethyl-N,N-Diisopropylphosphoramidite. The silane layer was made from N (3-(triethoxysilyl)-propyl)-4-hydroxybutyramide. As shown in FIG. 11, the resulting prepared substrate 100 can be exposed to light and active free OH groups will be revealed in areas that have been exposed to light.

Figure 12:
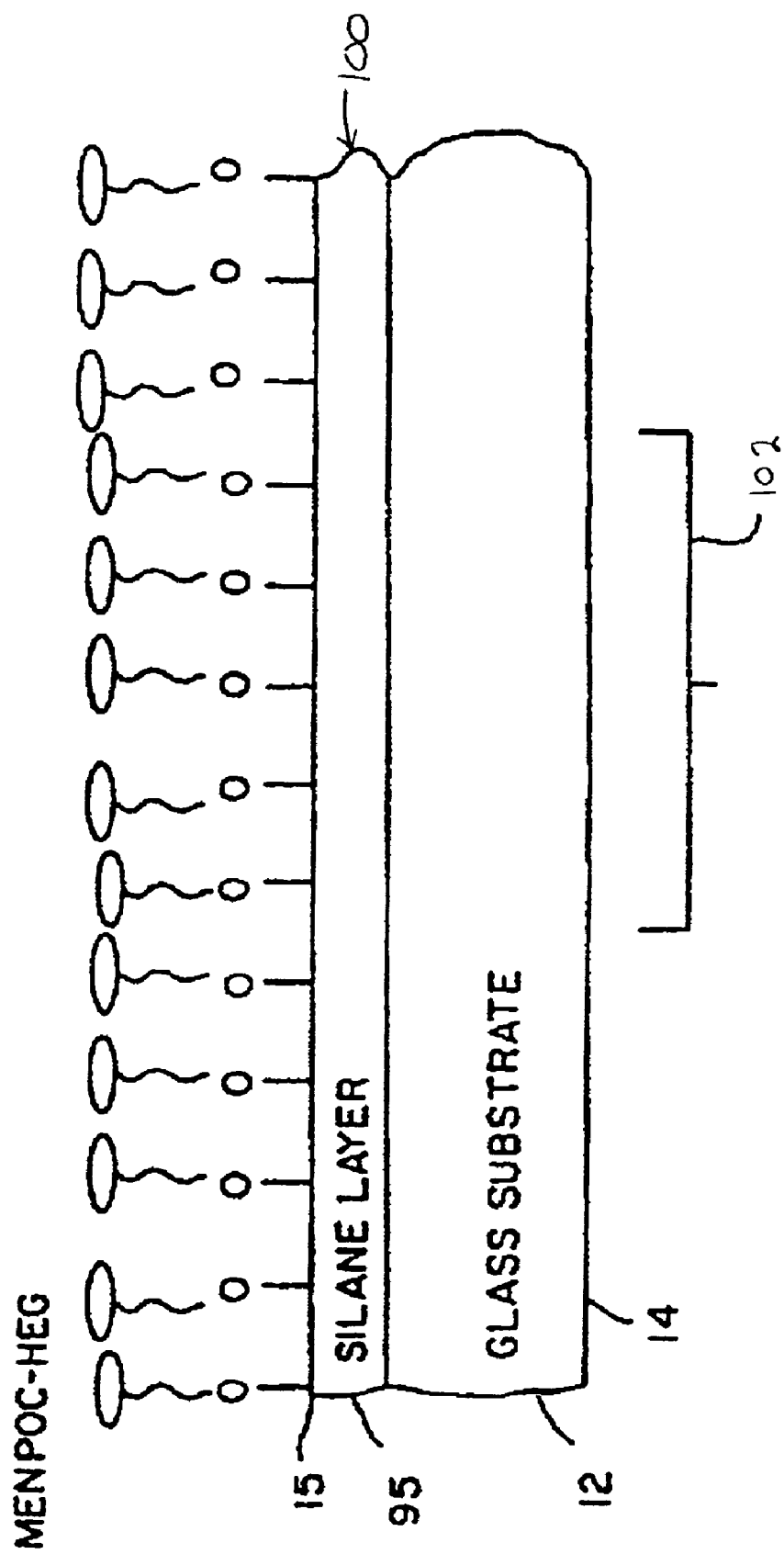
FIG. 12 is an illustrative view showing a substrate prepared for light directed DNA synthesis thereon with an active area of the substrate upon which DNA synthesis is to occur identified.

DNA synthesis will occur in defined regions 102 of the prepared substrate 100, as illustrated in FIG. 12. These are the "active" regions 102 of the prepared substrate 100 that will be light activated via a mask pattern to provide for DNA synthesis in these active areas 102. Areas of the substrate 100 surface outside of the defined active 102 areas are to remain inactive throughout the synthesis process. No DNA synthesis should occur in these inactive areas outside of the defined active areas 102.

Figure 13:
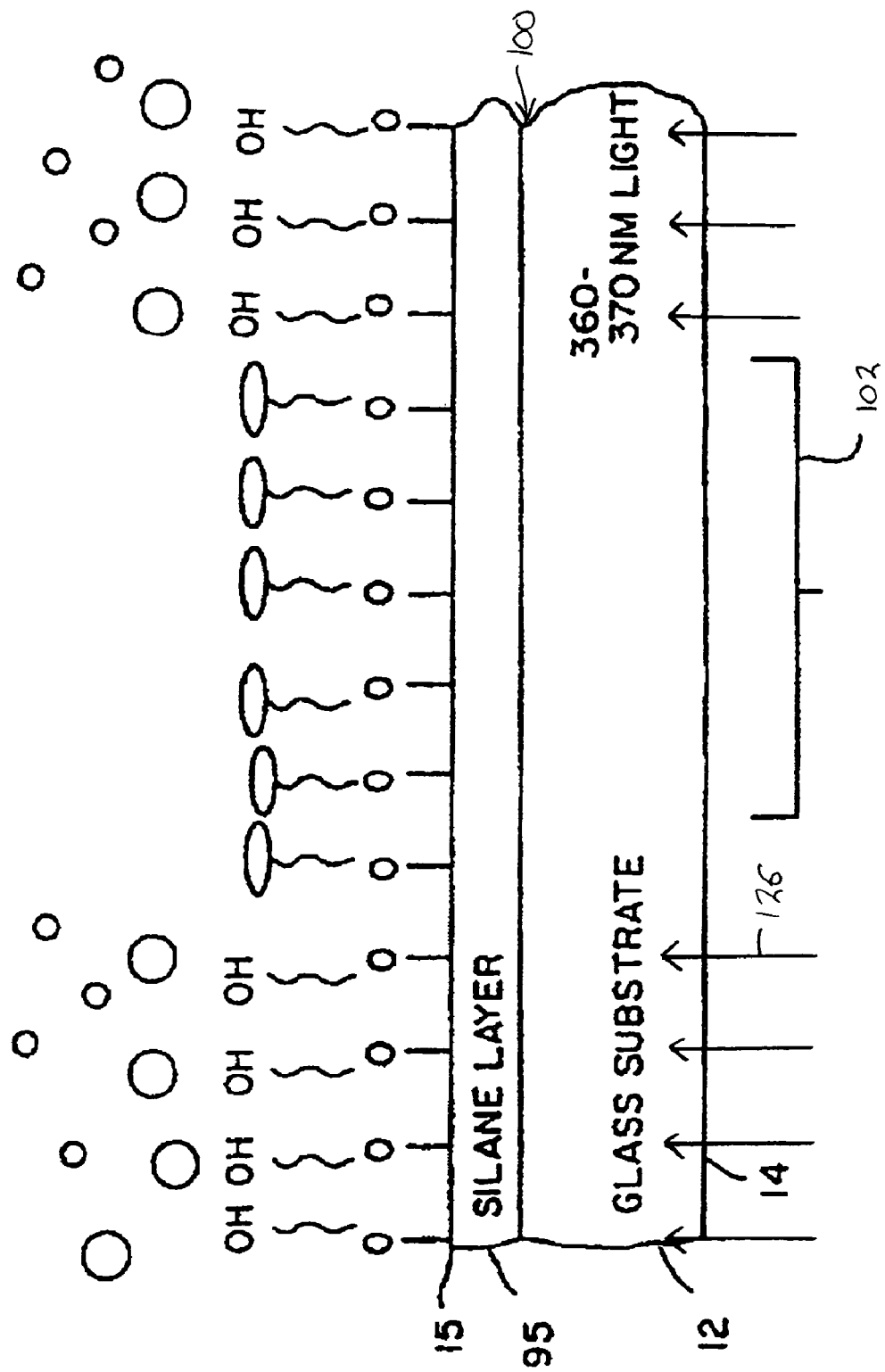
FIG. 13 is an illustrative view of the prepared substrate of FIG. 12 being exposed to light in an inverse mask pattern to deprotect intended inactive regions of the substrate.

As illustrated in FIG. 13, inverse capping 110 in accordance with the present invention begins by exposing 124 the prepared substrate 100 to light 126 via an inverse mask pattern 112 such that the intended inactive areas of the prepared substrate 100 are exposed. This deprotects the intended inactive areas of the prepared substrate 100 surface while defining the active areas 102 of the prepared substrate 100 where DNA synthesis is to occur. The intended active areas 102 of the prepared substrate 100 are not exposed via the inverse mask pattern and remain protected.

The exposed and deprotected intended inactive areas of the prepared substrate 100 are then capped 128 in a conventional manner using conventional capping reagents. For example, conventional phosphoramidite or acetyl (acetyl-anhydride) capping reagents may be employed. Phosphoramodite capping reagents may preferably be employed in most DNA synthesis processes, as such capping reagents are considered more DNA friendly and thus less likely to adversely affect the DNA synthesis process than acetyl capping reagents. It should be understood that, in general, any material that permanently deactivates the intended inactive regions of the substrate may be used as, or in place of, the capping reagents.

Figure 14:
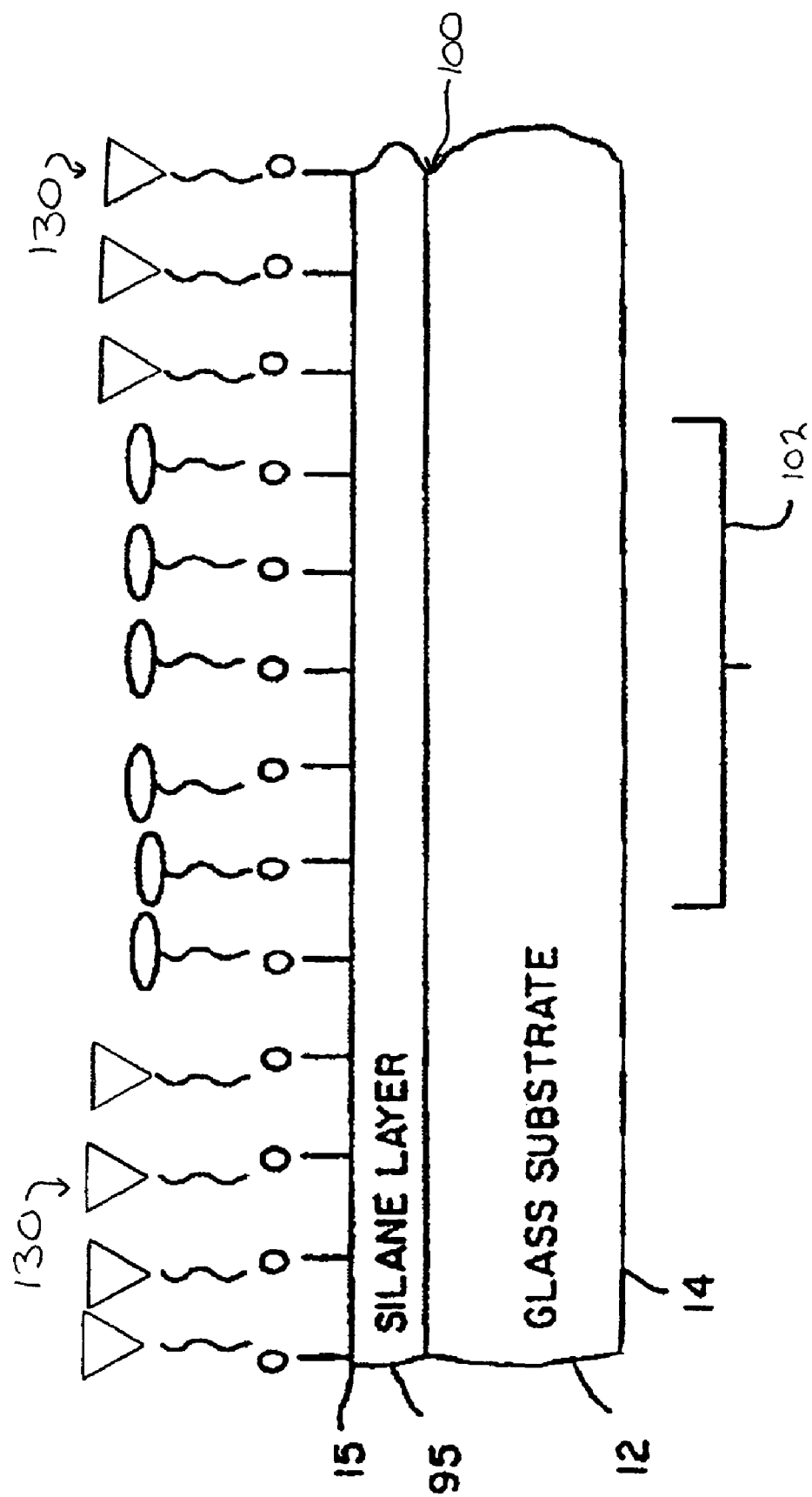
FIG. 14 is an illustrative view of the deprotected substrate of FIG. 13 after chemical capping of the deprotected intended inactive regions thereon to form an inverse capped substrate in accordance with the present invention.

Chemical capping of the intended inactive areas of the prepared substrate 100 in this manner disables the capped sites permanently. The resulting inverse capped substrate structure 100 is illustrated in FIG. 14. The permanently capped 130 areas of the substrate are not susceptible to DNA synthesis, even if exposed to light due to diffraction, scattering or flare during subsequent DNA synthesis processing. Thus, the synthesis of unwanted DNA in the intended inactive areas of the prepared substrate 100 is prevented.

It should be noted that light diffraction, scattering, and flare might result in exposure of some portions of the intended active area 102 of the prepared substrate 100 during the step 124 of exposing the intended inactive regions of the substrate.

Thus, certain sites in the intended active area 102 may be deprotected and capped, and thus permanently disabled, by the inverse capping process. This may reduce the number of sites in the intended active area 102 of the prepared substrate 100 to which DNA may be coupled during subsequent DNA synthesis. However, this limitation is well compensated by the error reduction provided by the inverse capping method of the present invention.

The inverse capped substrate 100 may then be employed for light directed DNA synthesis 132 in the intended active regions 102 thereof in a conventional manner. Selected ones of the active regions 102 may be exposed 134 via a mask pattern to deprotect selected intended active areas 102 of the prepared substrate 100. Oligonucleotide bases may then be chemically coupled 136 to the deprotected sites in those active areas 102, followed by an oxidation 138 for molecular bond stabilization. Finally, the unsuccessful sites that remain uncoupled are capped (inactivated) 140 to prevent subsequent unwanted (photo chemical reactions. These four steps, i.e., photo deprotection 134, coupling 136, oxidation 138, and capping 140, are repeated 142 to the synthesis completion.

Figure 15:
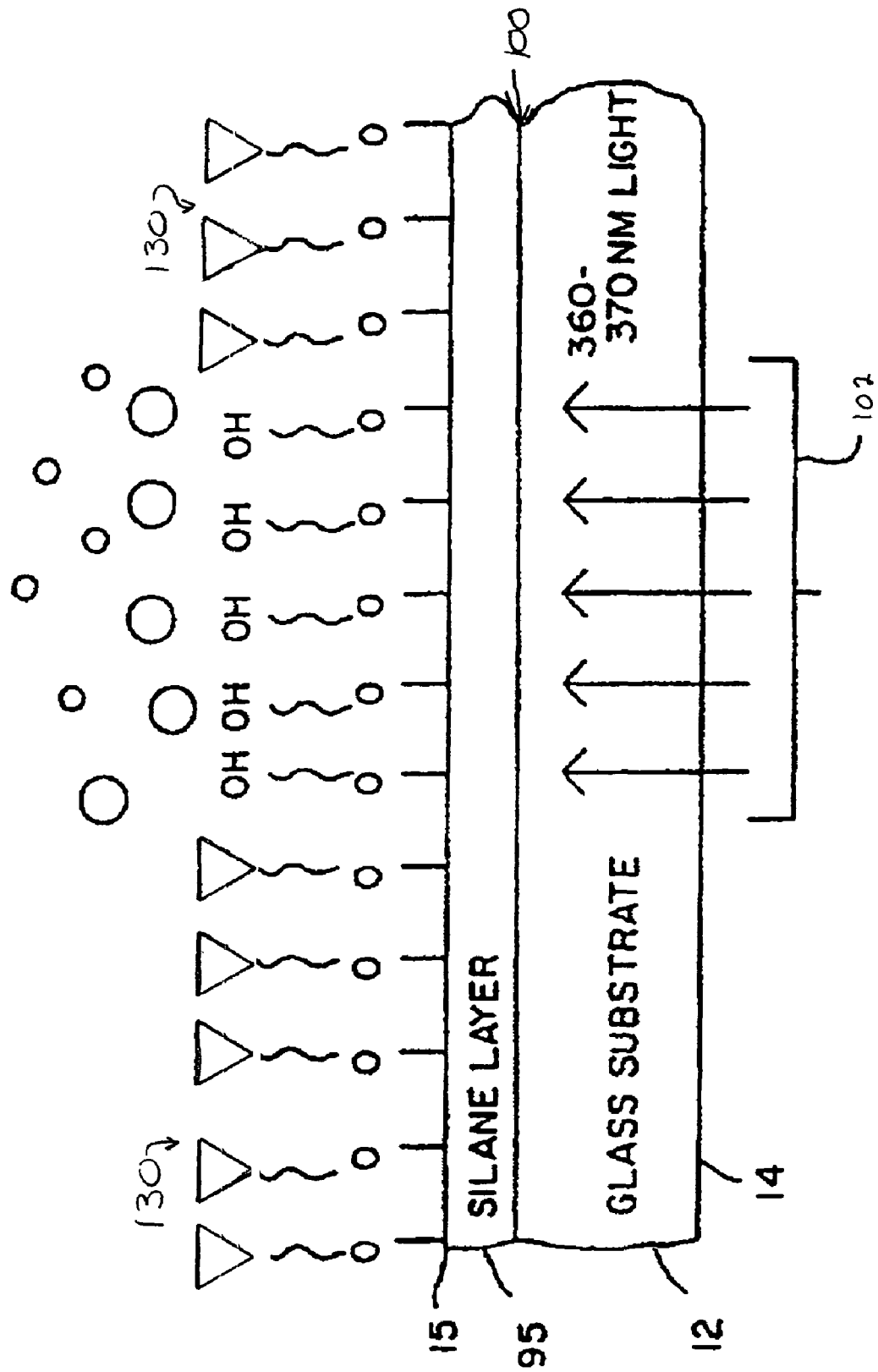
FIG. 15 is an illustrative view showing the photo-deprotection of the linker molecule and the production of free OH groups in the intended active regions on the inverse capped substrate of FIG. 14.
Figure 16:
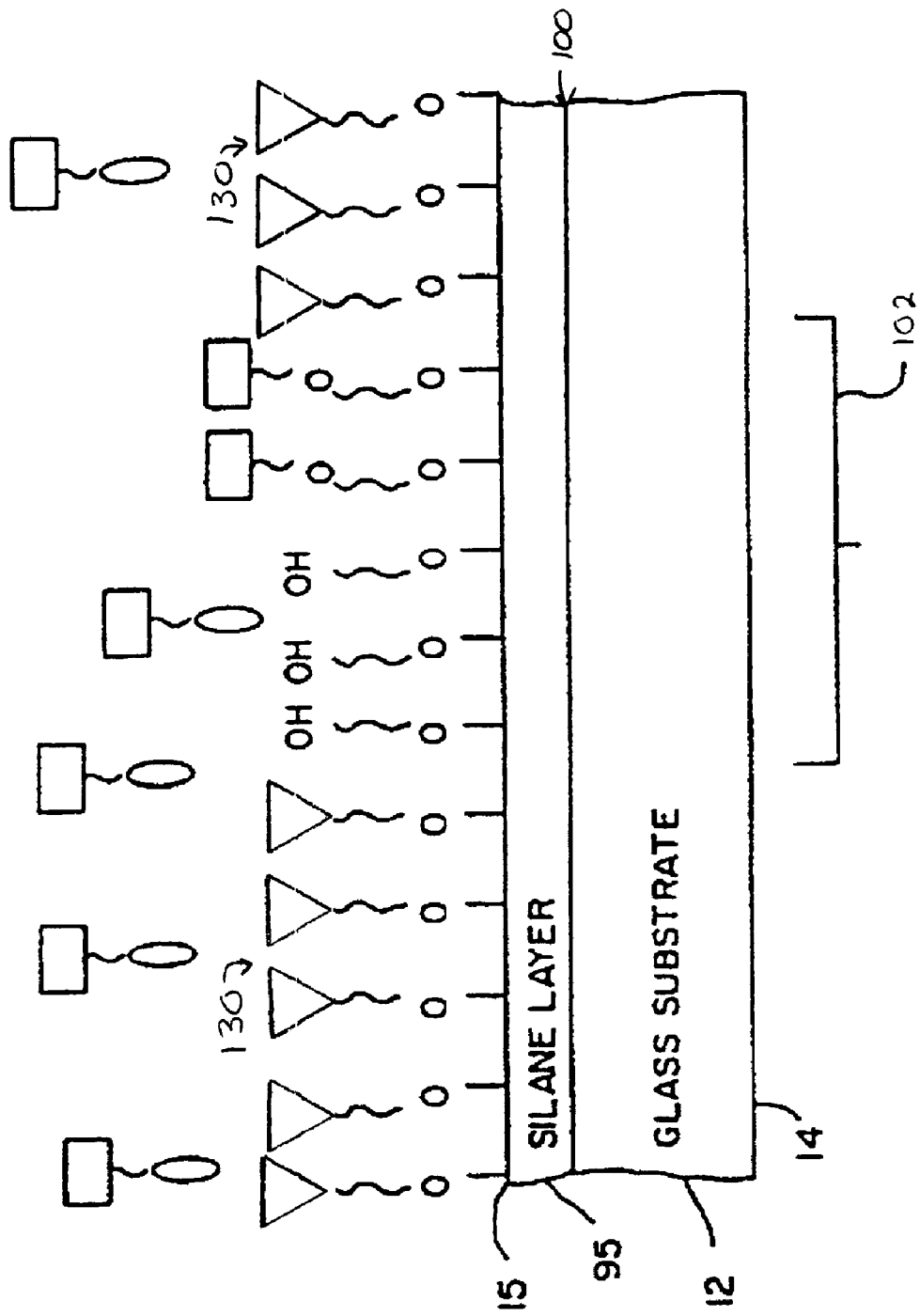
FIG. 16 is an illustrative view showing the coupling of markers to free OH groups produced by the photo-deprotection of the linker molecules on the inverse capped substrate of FIG. 14.
Figure 17:
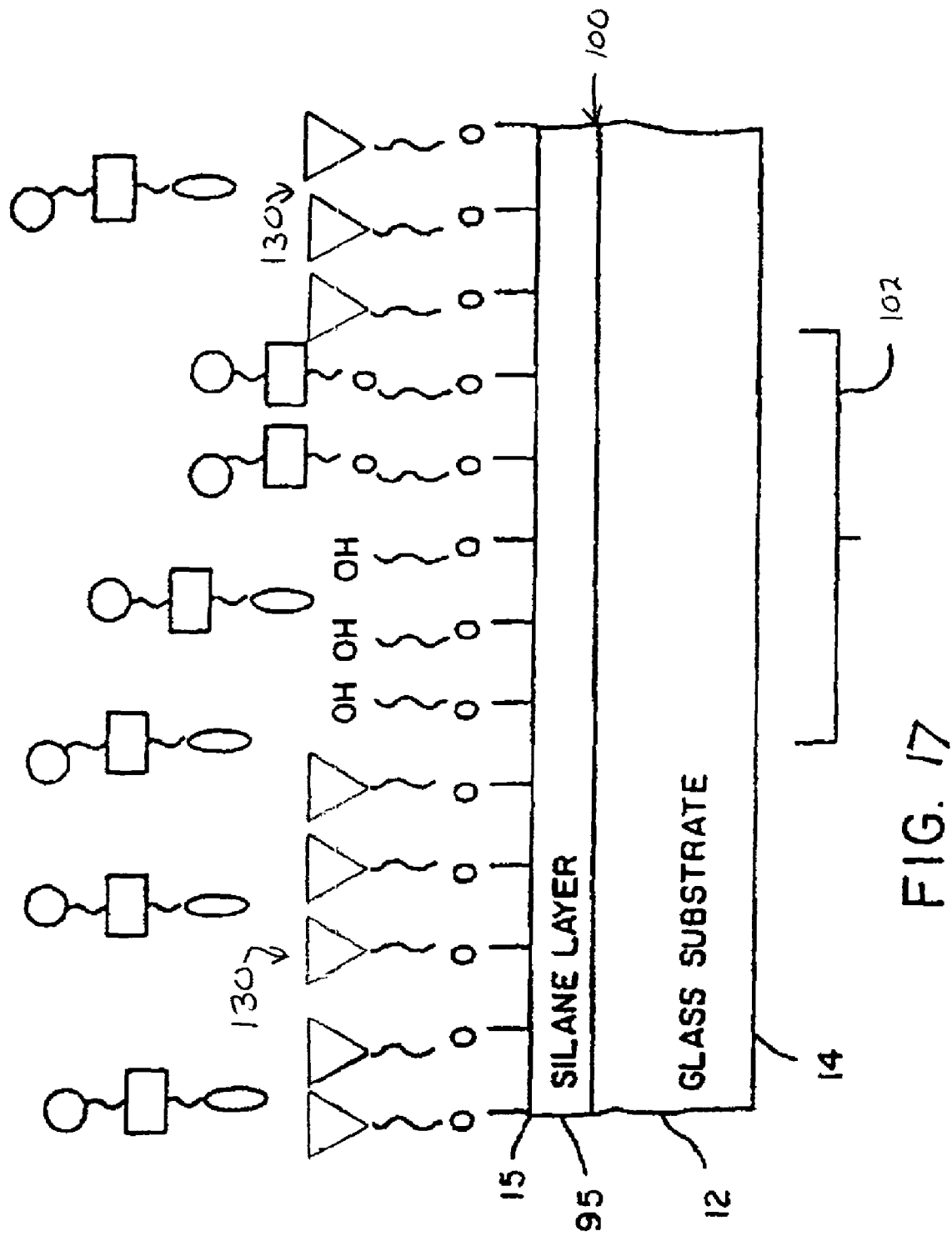
FIG. 17 is an illustrative view showing the coupling of nucleotides to free OH groups produced from photo-deprotection of the linker molecules on the inverse capped substrate of FIG. 14.
Figure 18:
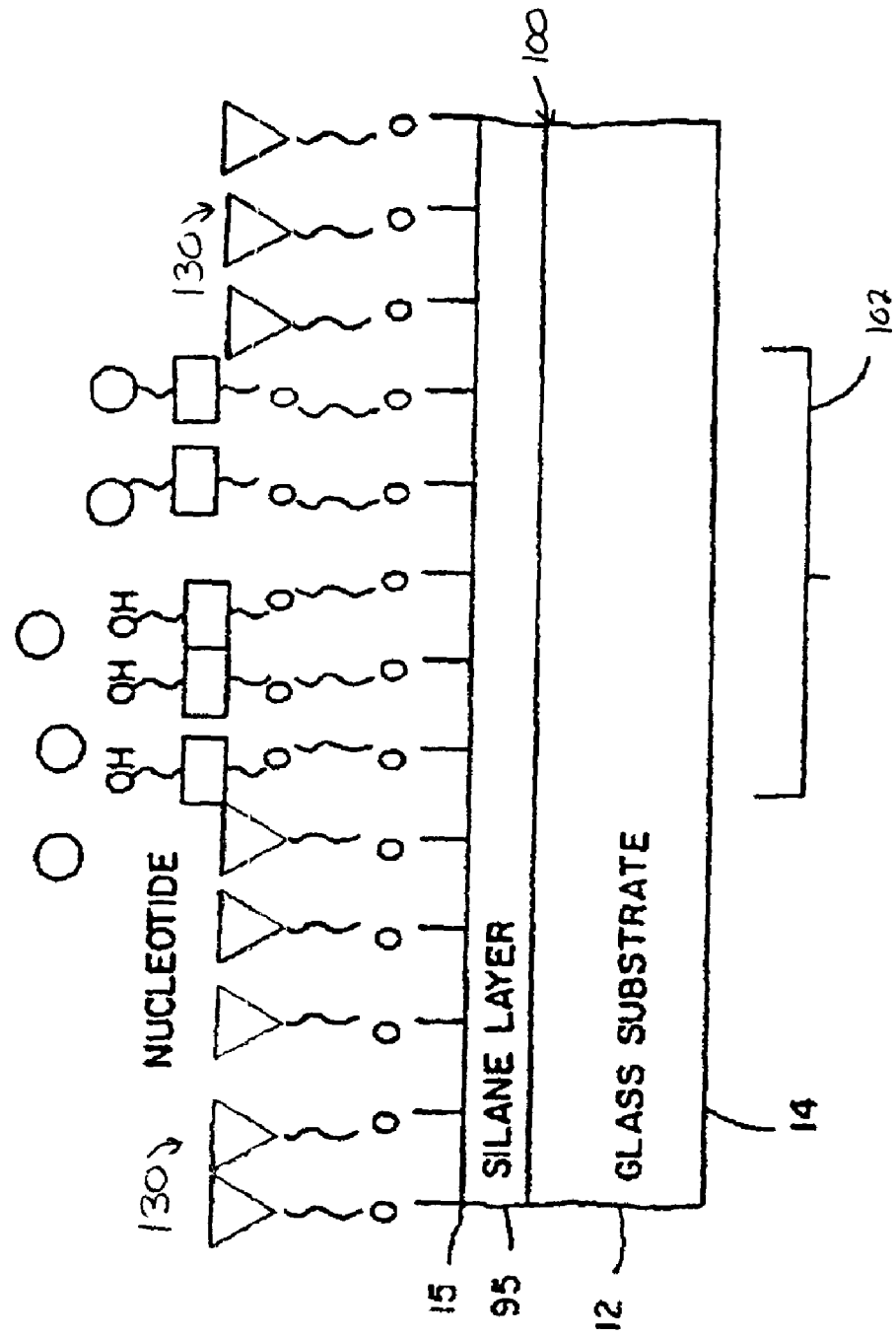
FIG. 18 is an illustrative view showing deprotection of nucleotides on the inverse capped substrate of FIG. 14.
Figure 19:
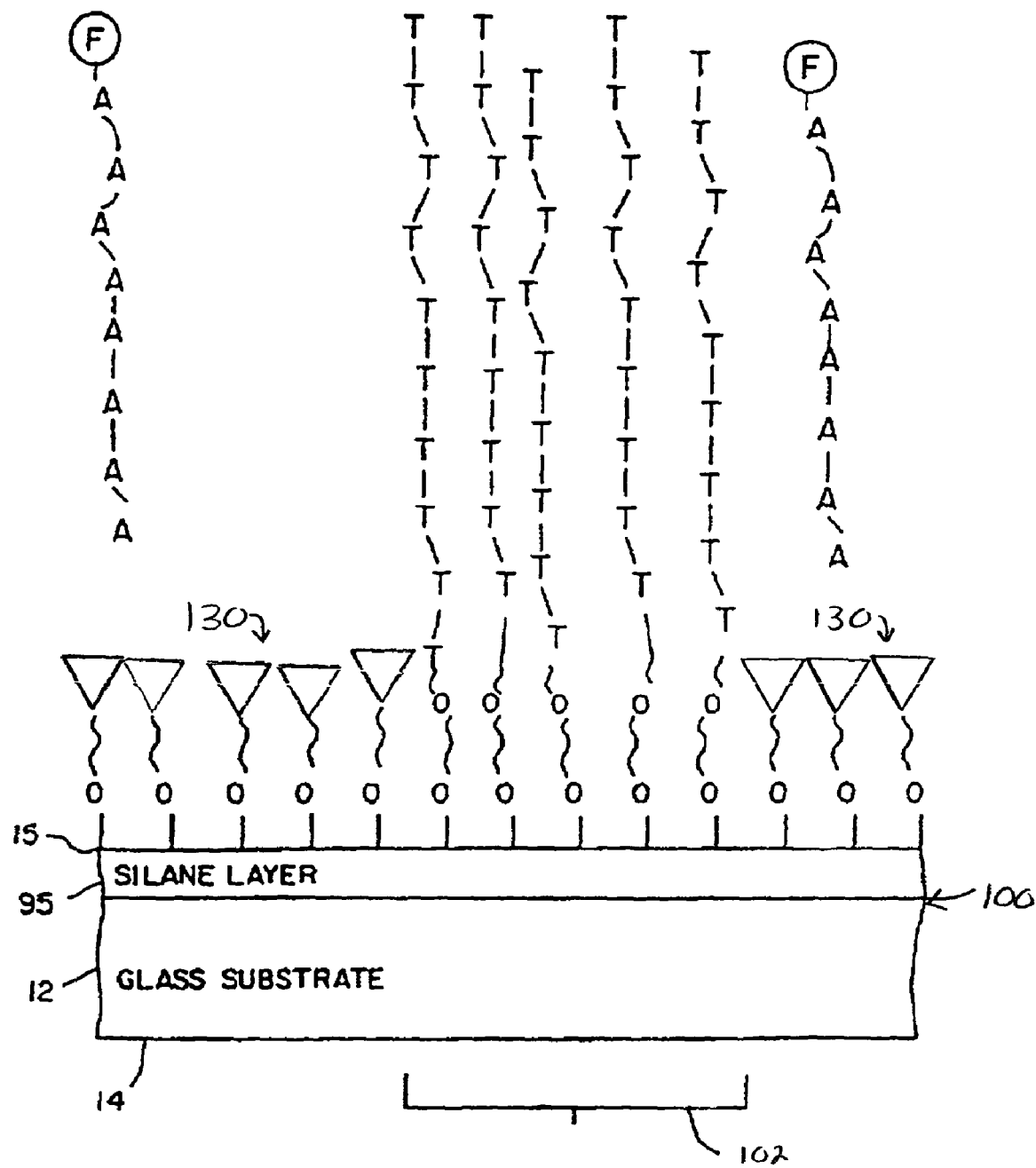
FIG. 19 is an illustrative view showing the hybridization of poly-A probes labeled with fluorescein to poly-T oligonucleotides (SEQ ID NO:1) on an inverse capped substrate and synthesized from DMT nucleotide-CEPs.

An exemplary process for forming DNA probes directly on an inverse capped substrate 100 in accordance with the present invention is illustrated with respect to the schematic diagrams of FIGS. 15-19. FIG. 15 illustrates the photo-deprotection of the MENPOC-HEG linker and the production of free OH groups in the intended active area 102 that is exposed to light. FIG. 16 illustrates the coupling of FlurePrimeJ fluorescein amidite to free OH groups produced from photo-deprotection of MENPOC-HEG in the active area 102. FIG. 17 illustrates the coupling of DMT-nucleotide to free OH groups produced from photo-deprotection of MENPOC-HEG linker. FIG. 18 illustrates the step of acid deprotection of DMT-nucleotides in the active area 102 exposed to light. FIG. 19 illustrates the hybridization of poly-A probe labeled with fluorescein with poly-T oligonucleotides (SEQ ID NO:1) synthesized from DMT-nucleotide-CEPs.

In an alternative embodiment for making an array and for which inverse capping in accordance with the present invention also may be used for synthesis error reduction the entire surface of the substrate on which the array is to be made is covered with photolabile protecting group ("P") by a liner ("O"). While any suitable photolabile protective groups can be used, the preferred chemistry uses 5'-[1-nitrophenyl)-propyloxycarbonyl]-2'-deoxynucleoside phosporamides (NPPOC). As an alternative, the substrate can also be covered with a single nucleotide, or identical short polynucleotides, again with a photolabile protective group at their termini. Inverse capping 110 is performed as above to permanently disable the intended inactive regions of the prepared substrate. A micromirror array is then illuminated to degrade the NPPOC in selected active array segment or cell where DNA is to be added. Then DNA dimers, in this case dimers of sequence AT, are exposed to the substrate, thereby chemically bonding to the array only in the cell to which the light had been directed by the micromirror array. The small DNA polymers include another photolabile protective group appended to their terminus. Then this same process of light illumination and dimer addition is repeated for the dimer sequence AC. This same process is then repeated 14 more times for each of the other possible DNA dimers that can be made from combinations of two nucleotides. At the end of the completion of a layer of the DNA probe synthesis process two nucleotides have been added to each nascent probe in the microarray. This process is then restarted in the next level, and the process is repeated until the probes are built out to a desired length.

Figure 20:
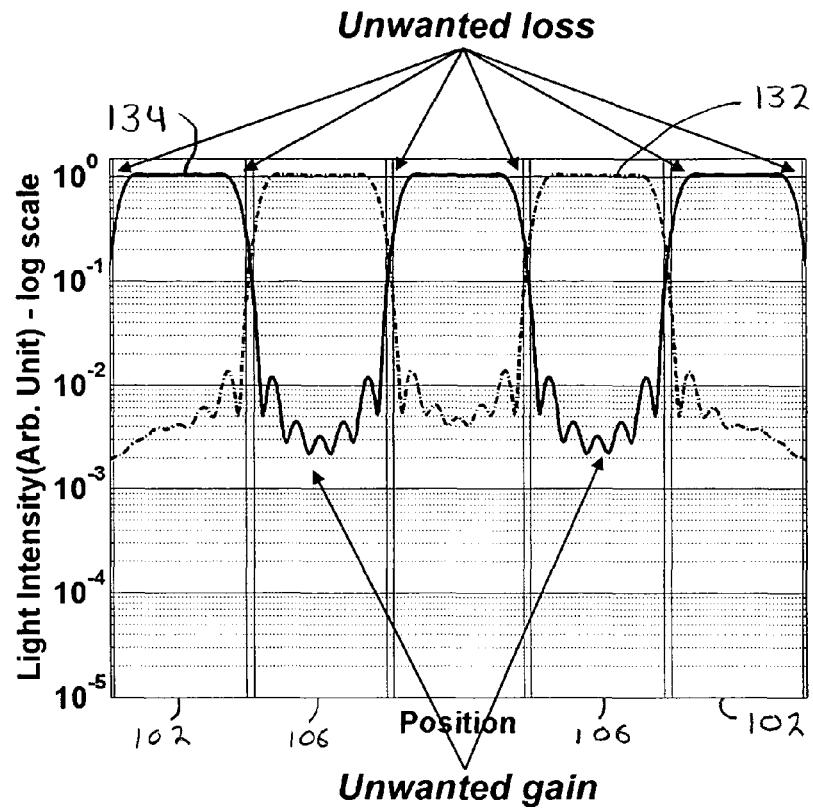
FIG. 20 is a graph illustrating inverse capping and DNA synthesis light intensity across a substrate surface.

FIG. 20 shows a graphical representation of light intensity from inverse capping 132 and DNA synthesis processes 134 across several pixels. Note that there is some light exposure in the intended inactive regions. However, full exposure and capping in these regions in accordance with the present invention prevents any synthesis in these areas resulting from such exposure.

Figure 21:
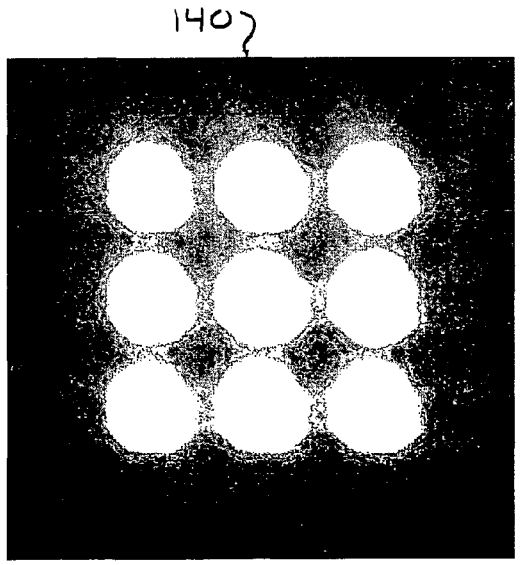
FIG. 21 is an image of a DNA array formed using light directed synthesis without inverse capping and with inverse capping in accordance with the present invention, showing the improved DNA array quality when inverse capping is employed.
Figure 21:
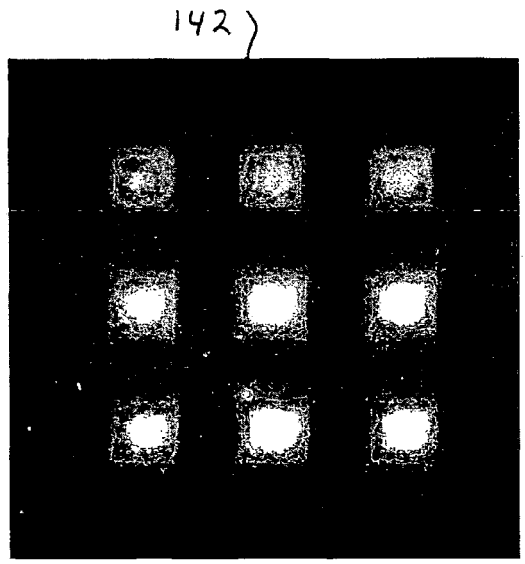

The effectiveness of inverse capping in accordance with the present invention to reduce errors in light directed DNA synthesis is illustrated in FIG. 21. Monomer T was grown on a substrate using conventional DNA synthesis without and with inverted capping in accordance with the present invention and labeled with Cy-3 fluorescence dye. (In this case, the substrate was overexposed to emphasize, in this illustration, the improvement achieved.) Images of the resulting DNA microarray formed without 140 inverse capping and with 142 inverse capping show the disappearance of detrimental optical effects by applying the inverse capping scheme. Specifically, by applying inverse capping in accordance with the present invention DNA synthesis is limited to the areas or pixels of the substrate upon which DNA synthesis is intended.

It should be understood that the present invention is not limited to the particular exemplary applications and embodiments as illustrated and described herein, but embraces all such modified forms thereof as come within the scope of the following claims.

What is claimed is:

1. A method of synthesizing biochemical molecules on a substrate, comprising:
   (a) providing a substrate prepared for light directed synthesis of biochemical molecules thereon;
   (b) exposing the prepared substrate to light in an inverse mask pattern to define an array of active sites and intended inactive regions thereon, thereby deprotecting the intended inactive regions, wherein the intended inactive regions comprise an interstitial space between the active sites and a space around the array;
   (c) disabling permanently biochemical molecule synthesis in the deprotected intended inactive regions of the substrate; and
   (d) synthesizing biochemical molecules in the array of active sites.

2. The method of claim 1 wherein the substrate is a flat substrate.

3. The method of claim 1 wherein exposing the prepared substrate to light in the inverse mask pattern includes exposing the intended inactive regions to light and wherein the array of active sites is not exposed to light.

4. The method of claim 1 wherein exposing the substrate to light in the inverse mask pattern includes exposing the substrate to a light pattern produced by a micromirror array.

5. The method of claim 1 wherein exposing the substrate to light in the inverse mask pattern includes exposing the substrate to a light pattern produced by a photolithography mask.

6. The method of claim 1 wherein disabling permanently biochemical molecule synthesis in the deprotected intended inactive regions of the substrate includes capping the deprotected intended inactive regions.

7. The method of claim 6 wherein capping the deprotected intended inactive regions of the prepared substrate includes exposing the prepared substrate to a capping reagent.

8. The method of claim 7 wherein the capping reagent is selected from the group of capping reagents consisting of phosphoramidite capping reagents and acetyl capping reagents.

9. The method of claim 1 wherein synthesizing biochemical molecules in the array of active sites includes the steps of exposing selected active site or sites in the array to light to deprotect the selected active site or sites and coupling biochemical molecules to the selected deprotected active site or sites.

10. The method of claim 9 wherein the biochemical molecules are DNA molecules.

11. A substrate prepared for light directed synthesis of a biochemical molecule thereon, comprising:
   (a) an array of active sites on a substrate surface that are susceptible to deprotection by light exposure and subsequent biochemical molecule coupling thereto; and
   (b) intended inactive regions of the substrate surface that have been deprotected in an inverse mask pattern and exposed to a capping reagent so as to prevent biochemical molecule synthesis thereon, wherein the intended inactive regions comprise an interstitial space between the active sites and a space around the array.

12. The substrate of claim 11 wherein the capping reagent is selected from the group of capping reagents consisting of phosphoramidite capping reagents and acetyl capping reagents.

13. A method of preparing a substrate for light directed synthesis of biochemical molecules thereon, comprising:
   (a) exposing a substrate to light in an inverse mask pattern to define an array of active sites and intended inactive regions thereon, thereby deprotecting the intended inactive regions, wherein the intended inactive regions comprise an interstitial space between the active sites and a space around the array; and
   (b) capping the deprotected intended inactive regions of the substrate to disable permanently synthesis of biochemical molecules thereon.

14. The method of claim 13 wherein the substrate is a flat substrate.

15. The method of claim 13 wherein exposing the prepared substrate to light in the inverse mask pattern includes exposing the intended inactive regions to light and wherein the array of active sites is not exposed to light.

16. The method of claim 13 wherein exposing the substrate to light in the inverse mask pattern includes exposing the substrate to a light pattern produced by a micromirror array.

17. The method of claim 13 wherein exposing the substrate to light in the inverse mask pattern includes exposing the substrate to a light pattern produced by a photolithography mask.

18. The method of claim 13 wherein capping the deprotected intended inactive regions of the substrate includes exposing the substrate to a capping reagent.

19. The method of claim 18 wherein the capping reagent is selected from the group of capping reagents consisting of phosphoramidite capping reagents and acetyl capping reagents.

* * * * *

UNITED STATES PATENT AND TRADEMARK OFFICE
CERTIFICATE OF CORRECTION

PATENT NO. : 7,994,098 B2  Page 1 of 1
APPLICATION NO. : 11/298949
DATED : August 9, 2011
INVENTOR(S) : Changhan Kim and Franco Cerrina It is certified that error appears in the above-identified patent and that said Letters Patent is hereby corrected as shown below:

Claim 18, Column 16, Lines 19-20: Delete "depro-lected" and substitute therefor -- depro-tected --.

Signed and Sealed this
Twenty-seventh Day of September, 2011

David J. Kappos
*Director of the United States Patent and Trademark Office*